United States Patent
Hiratsuka et al.

(10) Patent No.: US 10,013,103 B2
(45) Date of Patent: Jul. 3, 2018

(54) DISPLAY DEVICE AND METHOD OF DRIVING THE SAME

(71) Applicant: Japan Display Inc., Tokyo (JP)

(72) Inventors: Hitoshi Hiratsuka, Tokyo (JP); Koji Shigehiro, Tokyo (JP)

(73) Assignee: Japan Display Inc., Tokyo (JP)

( * ) Notice: Subject to any disclaimer, the term of this patent is extended or adjusted under 35 U.S.C. 154(b) by 122 days.

(21) Appl. No.: 15/078,992

(22) Filed: Mar. 23, 2016

(65) Prior Publication Data

US 2016/0283029 A1    Sep. 29, 2016

(30) Foreign Application Priority Data

Mar. 26, 2015    (JP) .................... 2015-064453

(51) Int. Cl.
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0418* (2013.01)

(58) Field of Classification Search
CPC ....... G06F 3/0416; G06F 3/0418; G06F 3/044
See application file for complete search history.

(56) References Cited

U.S. PATENT DOCUMENTS

| | | | | |
|---|---|---|---|---|
| 5,227,882 A * | 7/1993 | Kato | ................. | G09G 3/3611 348/441 |
| 5,717,441 A * | 2/1998 | Serizawa | ................. | G06T 1/60 345/571 |
| 2011/0248937 A1* | 10/2011 | Suzuki | ................. | G06F 3/0418 345/173 |
| 2011/0267293 A1* | 11/2011 | Noguchi | ................. | G06F 3/0416 345/173 |
| 2012/0050217 A1* | 3/2012 | Noguchi | ................. | G06F 3/0412 345/174 |
| 2012/0056835 A1* | 3/2012 | Choo | ................. | G06F 3/0412 345/173 |
| 2012/0262930 A1* | 10/2012 | Pyo | ................. | H01S 3/2308 362/382 |
| 2013/0082954 A1* | 4/2013 | Azumi | ................. | G06F 3/041 345/173 |
| 2014/0232664 A1* | 8/2014 | Henry | ................. | G06F 3/0412 345/173 |

(Continued)

FOREIGN PATENT DOCUMENTS

| | | |
|---|---|---|
| JP | 2012-048295 A | 3/2012 |
| JP | 2013-076795 A | 4/2013 |

*Primary Examiner* — Kenneth Bukowski
(74) *Attorney, Agent, or Firm* — Michael Best & Friedrich LLP

(57) ABSTRACT

According to one embodiment, a pixel signal from a memory is supplied to an arbitrary pixel. A controller selectively switches a scanning frequency of common electrodes including a touch detection system, between a higher frequency and a lower frequency, and allocates banks in the memory, each bank having a capacity of a fixed number of items of the pixel data. The controller defines one unit including a group of lines of the pixel data, sets a line number of the one unit to the fixed number when the scanning frequency is the higher frequency, and sets the line number of the one unit to another line number which is greater than the fixed number when the scanning frequency is the lower frequency.

17 Claims, 17 Drawing Sheets

(56) References Cited

U.S. PATENT DOCUMENTS

2014/0267101 A1* 9/2014 Iwaki ...................... G06F 3/048
                                                        345/173
2014/0354590 A1* 12/2014 Wang ...................... G06F 3/044
                                                        345/174
2017/0108982 A1* 4/2017 Shigehiro ............. G06F 3/0412

* cited by examiner

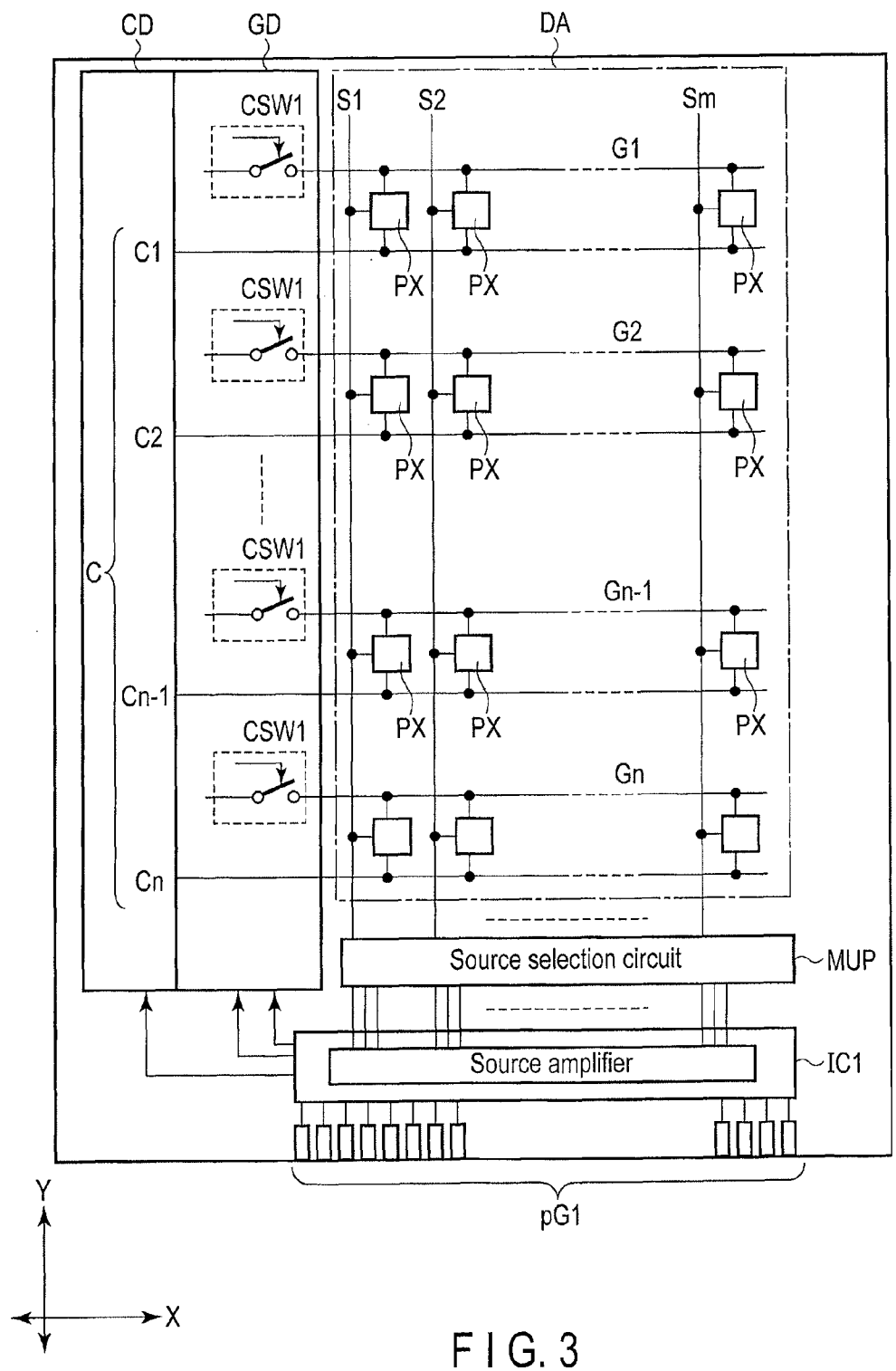
F I G. 3

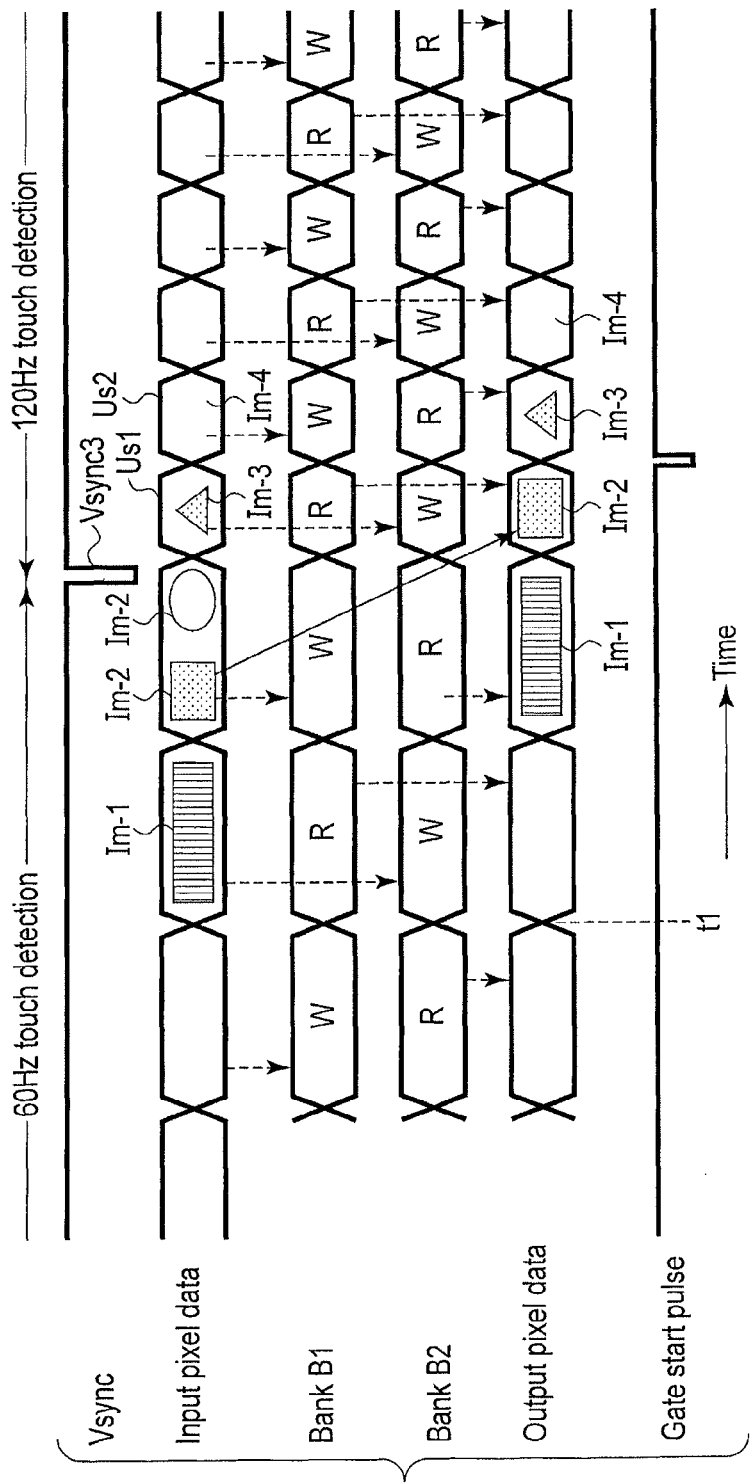
F I G. 13

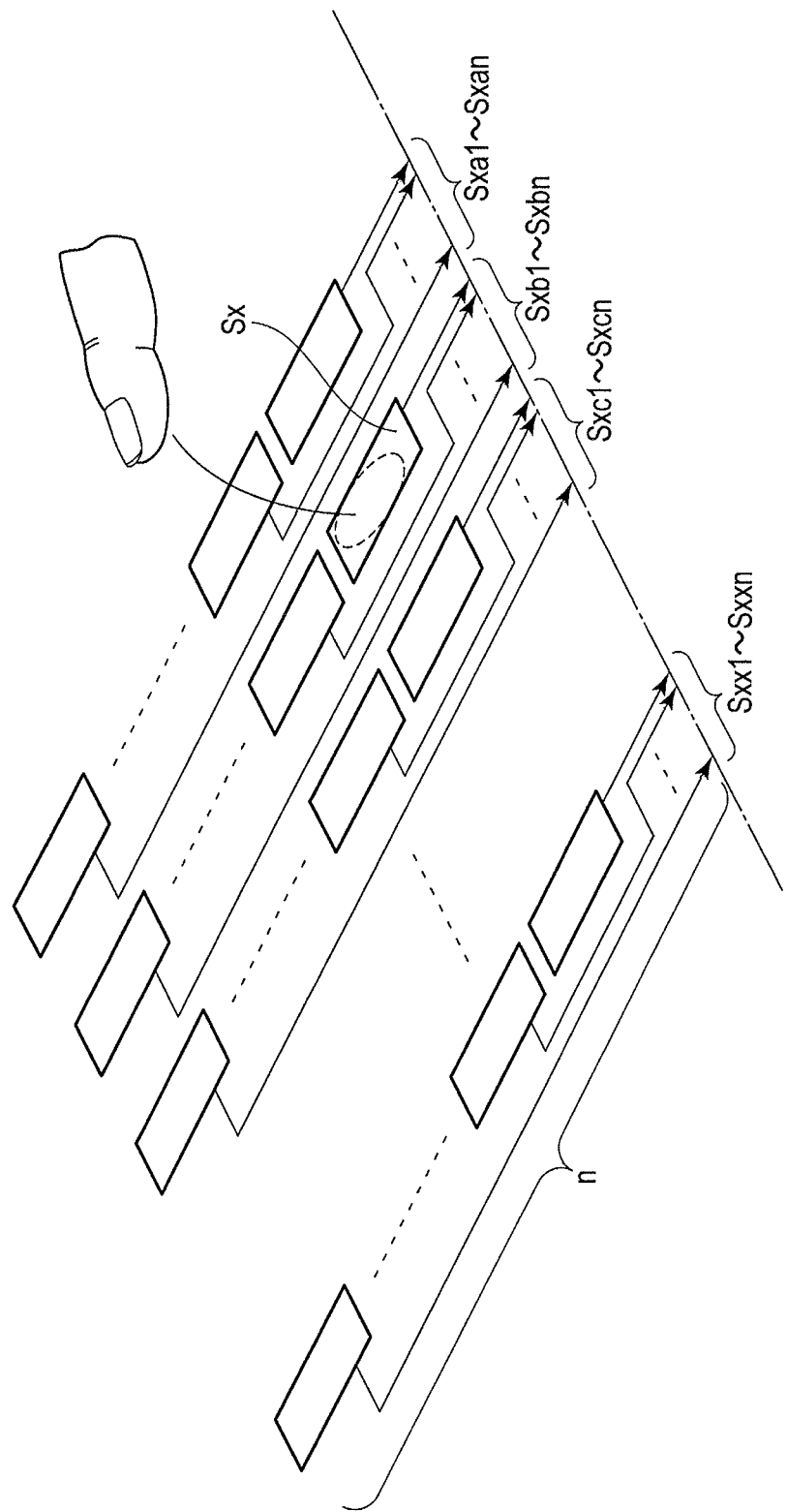
F I G. 16

DISPLAY DEVICE AND METHOD OF DRIVING THE SAME

CROSS-REFERENCE TO RELATED APPLICATIONS

This application is based upon and claims the benefit of priority from Japanese Patent Application No. 2015-064453, filed Mar. 26, 2015, the entire contents of which are incorporated herein by reference.

FIELD

Embodiments described herein relate generally to a display device and a method of driving the same.

BACKGROUND

Portable devices such as a smartphone, a tablet computer, a notebook computer and the like have been widespread. Such portable devices comprise a display device using liquid crystal, an organic electroluminescent element or the like. A display device comprises a microprocessor (also called a host device) configured to output pixel data, a command and the like and a driver configured to process the command and drive the display panel.

In a liquid crystal display device, pixels two-dimensionally arrayed on a display panel comprise common electrodes and pixel electrodes, and liquid crystal is sandwiched between the common electrodes and the pixel electrodes. A panel driver (also called a liquid crystal driver) can write a pixel signal to the pixels of the display panel. The liquid crystal between the common electrodes and the pixel electrodes is thereby controlled and an image is displayed.

The panel driver configured to supply a pixel signal to the pixels of the display panel generally comprises a frame memory. Pixel data from the outside is written to the frame memory. Pixel data corresponding to one horizontal line is sequentially read from the frame memory and converted into a pixel signal by analog conversion. The pixel signal is supplied to the pixels of the display panel.

The display device integrally comprises a touch detection system (also called a touchpanel). The touch detection system can detect a touch position in response to a touch of a user's finger, a stylus pen or the like on an icon or an operation button displayed on a display screen of the display device.

Recently, the touch detection system is configured such that a driving pulse for touch detection is supplied to the common electrodes. In the display device, operation for image display by the panel driver and operation for touch detection by the touch detection system are time-shared. For example, part of a display period of one frame is assigned for a touch detection period.

BRIEF DESCRIPTION OF THE DRAWINGS

FIG. 3 is an illustration schematically showing part of an equivalent circuit on a first substrate of the display panel.

FIG. 13 is an illustration to be compared with FIG. 12 and showing timings of writing and reading pixel data in the video memory and a state of output pixel data when the touch detection frequency is changed from 60 Hz to 120 Hz and a data capacity of each bank is also changed.

FIG. 16 is an illustration showing an example of a basic structure of a self-detection touch detection system.

DETAILED DESCRIPTION

Various embodiments will be described hereinafter with reference to the accompany drawings. As described above, operation for image display by the panel driver and operation for touch detection by the touch detection system are time-shared in the display device. Therefore, part of a display period is assigned for a touch detection period.

In the display device, price and size reduction of the panel driver is needed. Making the sensitivity of the touch detection system variable is also needed. However, there is a problem that an image is distorted if a touch detection period is changed to make the sensitivity variable.

Therefore, the embodiments aim to provide a display device and a method of driving the same capable of making the sensitivity of the touch detection system variable without image distortion. It should be noted that the term "touch" also means approach in the description.

In general, according to one embodiment, a display device comprises:

a display panel on which scan lines and signal lines intersect with each other and pixels are arranged near to intersections of the scan lines and the signal lines, respectively;

a memory to which pixel data is written and from which the written pixel data is read;

a pixel signal output circuit configured to output a pixel signal based on the pixel data read from the memory to the arbitrary pixels through the signal lines;

a touch detection system comprising driving electrodes and configured to detect signals corresponding to capacitance change based on a scanning signal supplied to the driving electrodes; and a controller configured to selectively switch a scanning frequency of the scanning signal for scanning the driving electrodes between a first frequency and a second frequency which is less than the first frequency, allocate banks in the memory regardless of whether the scanning frequency is the first frequency or the second frequency, each bank having a capacity of a fixed number of consecutive items of the pixel data.

The present embodiment will be described hereinafter with reference to the accompanying drawings. The present embodiment realizes price and size reduction of a panel driver (also may be called a liquid crystal driver) and makes the sensitivity of a touch detection system adjustable. According to the present embodiment, the capacity of a video memory can be reduced. Since the touch detection frequency can be switched and the touch sensitivity varied, touch detection performance can be improved. In addition to such improved usability, image display is stable without distortion. For example, an image can be stably displayed without distortion when the touch detection frequency is changed.

Figure 1:
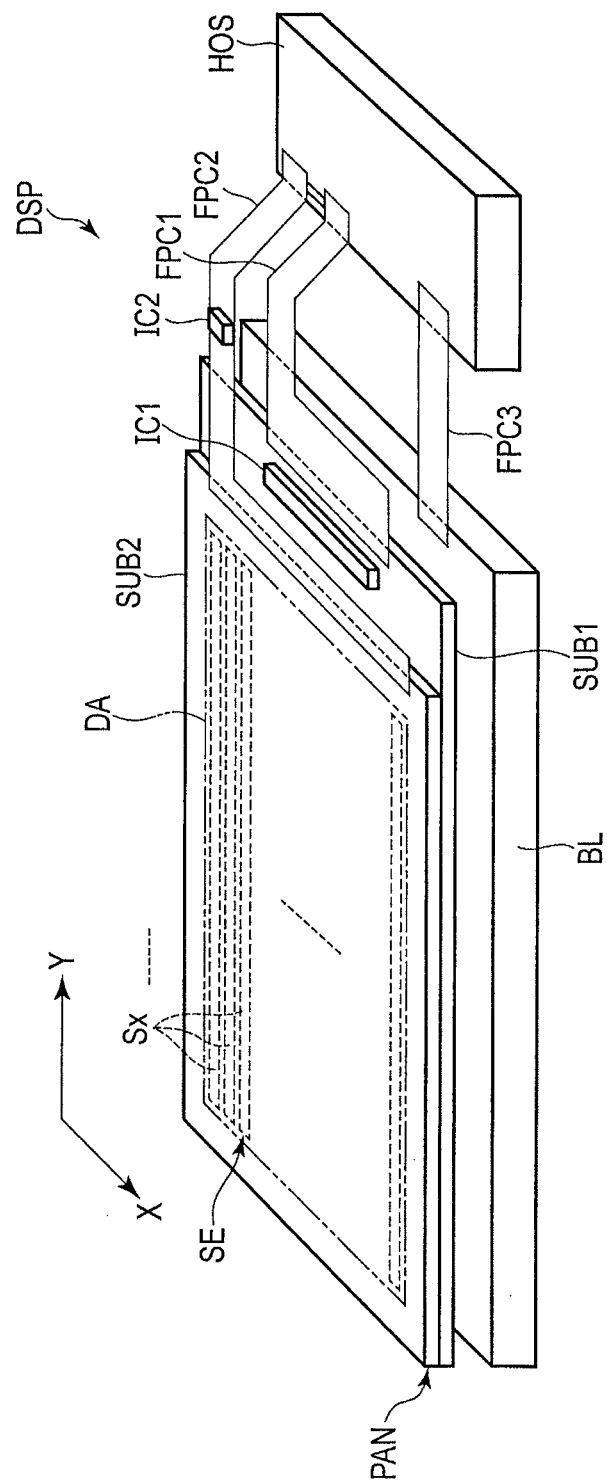
FIG. 1 is an illustration schematically showing an example of a general structure of a display device to which an embodiment is applied.

FIG. 1 is a plan view schematically showing a structure of a display device DSP of the embodiment. In FIG. 1, PAN represents a display panel integrated with a touch detection system. As the display panel PAN, a display panel using liquid crystal and a display panel using organic electroluminescence can be used. In the present embodiment, the display panel using liquid crystal is described as a representative. The display panel PAN comprises a first substrate SUB1, a second substrate SUB2 located to face the first substrate SUB1 and a liquid crystal layer formed between the first substrate SUB1 and the second substrate SUB2. The first substrate SUB1 and the second substrate SUB2 may also be called an array substrate and a counter substrate, respectively. A panel driver IC1 configured to drive the display panel PAN is mounted on, for example, the first substrate SUB1. The panel driver IC1 may also be called a liquid crystal driver, a first IC chip or a drive circuit.

The display panel PAN is integrated with, for example, a capacitance change detection touch detection system SE. In FIG. 1, touch detection electrodes (also called touch detection elements) Sx forming the touch detection system SE are provided in a display area (also called an active area) DA of the display panel PAN. The touch detection electrodes Sx are, for example, transparent electrodes, and are formed of indium tin oxide (ITO), etc. The touch detection electrodes Sx may be provided outside or inside the display panel PAN. The touch detection electrodes Sx may be provided in the periphery of the display area DA. The touch detection system SE is controlled by a touchpanel controller 102 (also called a second IC chip or a sensor circuit). The touch detection electrodes Sx may be formed of metal. In the case where the touch detection electrodes Sx are formed of metal, the touch detection electrodes Sx should preferably have a mesh structure or be subjected to blackening.

A host device (also called an external controller) HOS is provided. The host device HOS is connected to the display panel PAN via a flexible printed circuit board FPC1 and the panel driver IC1, and connected to the touch detection system SE via a flexible printed circuit board FPC2 and the touchpanel controller 102. The panel driver IC1 and the touchpanel controller 102 may be the same chip. For example, either of flexible printed circuit boards FPC1 and FPC2 may be omitted by forming the touchpanel controller IC2 and the panel driver IC1 into the same chip and providing the chip on the second substrate SUB2, flexible printed circuit board FPC1 or flexible printed circuit board FPC2.

A backlight unit BL configured to illuminate the display panel PAN is provided under the first substrate SUB1. A flexible printed circuit board FPC3 connects the backlight unit BL to the host device HOS. Various types of backlight units BL are applicable. As a light source of the backlight unit BL, for example, a light emitting diode (LED) and a cold-cathode fluorescent tube (CCFL) can be used. In the present embodiment, the backlight unit BL provided on the back surface side of the display panel is described as a light device of the display device DSP. However, the light device may be a front light provided on the display surface side of the display panel. The light device may be a light device using a light guide plate and LED or CCFL provided on the side of the plate, or a light device using a point light source in which light emitting elements are two-dimensionally arrayed. When the display device DSP is a reflective display device or a display device using organic electroluminescence for a display panel, however, the light device may be unnecessary.

The sensor-equipped display device DSP further comprises a secondary battery, a power source circuit and the like (not shown).

Figure 2:
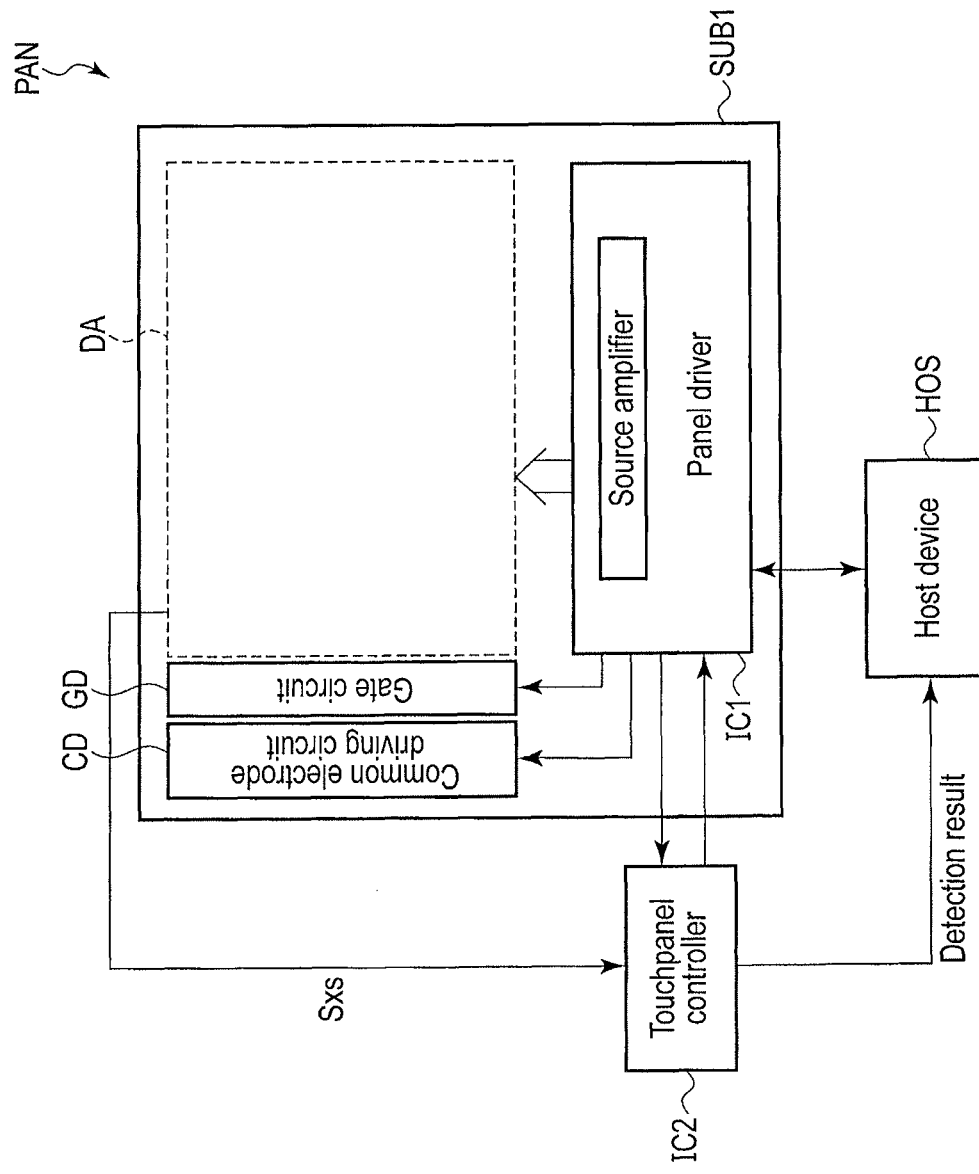
FIG. 2 is an illustration showing a main circuit block of FIG. 1.

FIG. 2 shows a main circuit block of FIG. 1. FIG. 3 schematically shows part of an equivalent circuit on the first substrate SUB1 of the display panel PAN. An area surrounded by dashed lines in FIG. 2 is the display area DA. A gate circuit GD is provided along a direction intersecting with a direction of extension of scan lines G1, G2, . . . in a non-display area of the first substrate SUB1 (FIG. 3). A common electrode driving circuit CD is provided side by side with the gate circuit GD. In the case of a display device in which common electrodes are formed along scan lines, the common electrode driving circuit CD is provided side by side with the gate circuit GD. In contrast, in the case of a display device in which common electrodes are formed along signal lines, the common electrode driving circuit CD is provided between the panel driver IC1 and the display area DA along a direction intersecting with a direction of extension of the signal lines. The panel driver IC1 is provided along the direction intersecting with signal line S1, S2, . . . in the non-display area of the first substrate SUB1. The panel driver IC1 can control the gate circuit GD and the common electrode driving circuit CD. The panel driver IC1 includes a source amplifier (also called a pixel signal output circuit), and can write a pixel signal to pixels (also called display elements) of the display panel PAN via the source amplifier. As described above, the display panel PAN can set a period of writing to pixels, a display period and a touch detection period (also called a touch position detection period).

The touchpanel controller IC2 processes touch detection signals Rxs obtained from the touch detection electrodes Sx and obtains coordinate data of a touch position of the user's finger on the display surface. The coordinate data is input to the host device HOS. The panel driver IC1 intercommunicates with the host device HOS to require and receive data. The host device HOS can supply the panel driver IC1 with video data, a command, a synchronization signal and the like.

FIG. 3 is an illustration schematically showing part of an equivalent circuit on the first substrate SUB1 of the display panel PAN. The display panel PAN comprises the display area DA in which an image is displayed. The display area may include a dummy pixel. In the non-display area of the first substrate SUB1, a source selection circuit MUP, the gate circuit GD, the common electrode driving circuit CD and a group of outer lead bonding pads (hereinafter referred to as an OLB pad group) pG1 are formed.

The panel driver IC1 is connected to the source selection circuit MUP, the gate circuit GD, the common electrode driving circuit CD and the OLB pad group pG1. The panel driver IC1 and the gate circuit GD are connected via a control line for outputting a panel control signal, which is not entirely shown. The panel driver IC1 can provide a control signal to control switching elements CSW1 via the control line. The source selection circuit MUP can select an arbitrary signal line (for red, green or blue pixel) in accordance with a red, green or blue pixel signal to be output, and output the red, green or blue pixel signal to the selected signal line. The source selection circuit MUP is provided separately from the panel driver IC1 including the source amplifier. However, the panel driver IC1 may have the same function as the source selection circuit MUP.

In the display area DA, pixels Px are located between the first substrate SUB1 and the second substrate SUB2 (not shown). A matrix of m×n pixels Px is arranged in a first direction X and a second direction Y (m and n are positive integers).

In the display area DA, n scan lines G (G1 to Gn), m signal lines S (S1 to Sm), common electrodes C (C1, . . . , Cn) and the like are formed on the first substrate SUB1.

The scan lines G extend substantially linearly in the first direction X, are led out to the outside of the display area DA, and are connected to the gate circuit GD. The scan lines G are spaced apart and aligned in the second direction Y. A scanning signal is supplied to the scan lines G (G1, G2, . . . , Gn) at each scanning timing via the control switching elements CSW1.

The signal lines S extend substantially linearly in the second direction Y and intersect with the scan lines G. The signal lines S are spaced apart and aligned in the first direction X. The signal lines S are led out to the outside of the display area DA and connected to the source selection circuit MUP.

The common electrodes C (C1, C2, . . . , Cn) are, for example, strip-shaped, extend substantially linearly in the first direction X, and are spaced apart and aligned in the second direction Y. For example, the common electrodes C may be divisional electrodes constituted by bundles of several (for example, three) electrodes. As described above in connection with the common electrode driving circuit CD, the common electrodes may extend in the second direction Y.

The common electrodes C (C1, C2, . . . , Cn) are led out to the outside of the display area DA and connected to the common electrode driving circuit CD. The scan lines G, the signal lines S and the common electrodes C do not necessarily extend linearly and may be partially bent.

The gate circuit GD comprises n control switching elements CSW1. Each of the n control switching elements CSW1 can be selectively turned on or off to control permission and prohibition of writing an image signal to the corresponding pixel Px. For example, in case of emergency (in case of singular control operation), the n control switching elements CSW1 can be concurrently turned on to permit writing of an image signal of a black level to all the pixels Px.

When the gate circuit GD selects a scan line, a pixel signal is written to a group of pixels connected to the scan line via signal lines selected by a selection circuit.

Figure 4:
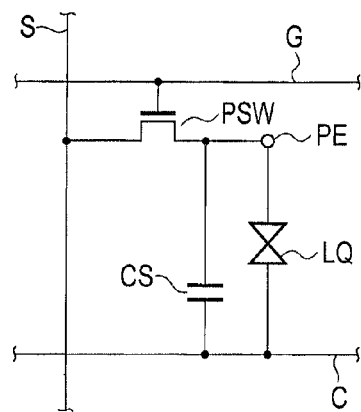
FIG. 4 is an illustration showing an equivalent circuit of a pixel Px of FIG. 3.

FIG. 4 is an equivalent circuit diagram showing the pixel Px of FIG. 3. The pixel Px comprises a pixel switching element PSW, a transparent pixel electrode PE, a transparent common electrode C and the like. The pixel switching element PSW is realized by, for example, a thin-film transistor (TFT). The pixel switching element PSW is electrically connected to the scan line G and the signal line S. The pixel switching element PSW may be either a top or bottom gate TFT. A semiconductor layer of the pixel switching element PSW is formed of, for example, polysilicon but may be formed of amorphous silicon.

The pixel electrode PE is electrically connected to the pixel switching element PSW. The pixel electrode PE is opposed to the common electrode C through an insulating film. The common electrode C, the insulating film and the pixel electrode PE form a storage capacitor CS. When a pixel signal is written to the storage capacitor CS, optical space modulation of liquid crystal LQ between the pixel electrode PE and the common electrode C can be realized depending on the voltage corresponding to the pixel signal.

Figure 5A:
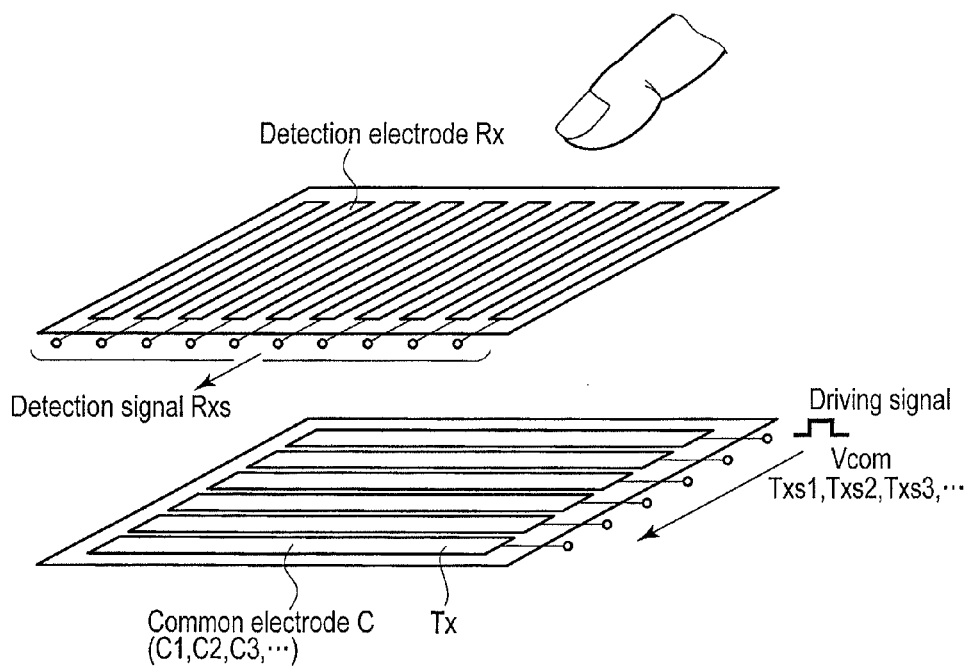
FIG. 5A is an illustration showing an example of a basic structure of a mutual detection touch detection system SE.

FIG. 5A is an illustration showing basic operation of the touch detection system SE. FIG. 5A shows a mutual (mutual capacitance) detection touch detection system SE. As touch detection electrodes Sx, touch detection electrodes Rx are formed like stripes, for example, in the second direction Y on the second substrate SUB2, and driving electrodes Tx are formed on the first substrate SUB1. The touch detection electrodes Rx intersect with the driving electrodes Tx. The driving electrodes Tx are used as the common electrodes C during a display period.

That is, the common electrodes C (C1, C2, C3, . . . ) are sequentially driven by high-frequency pulse driving signals (also called scanning signals or touch detection driving signals) Txs1, Txs2, Txs3, . . . in a touch detection period TDT to be described later. In this touch detection period, a touch detection signal Rxs of a level lower than that of the output from the other touch detection element Rx is detected from a touch detection element Rx close to an object such as a finger. This is because a second capacitance occurs between the finger and the touch detection electrode Rx close to the finger in addition to a first capacitance which occurs between this touch detection electrode Rx and the common electrodes C (C1, C2, C3, . . . ). In this case the second capacitance does not occur and only the first capacitance occurs between the other touch detection electrodes Rx and the common electrodes.

Figure 5B:
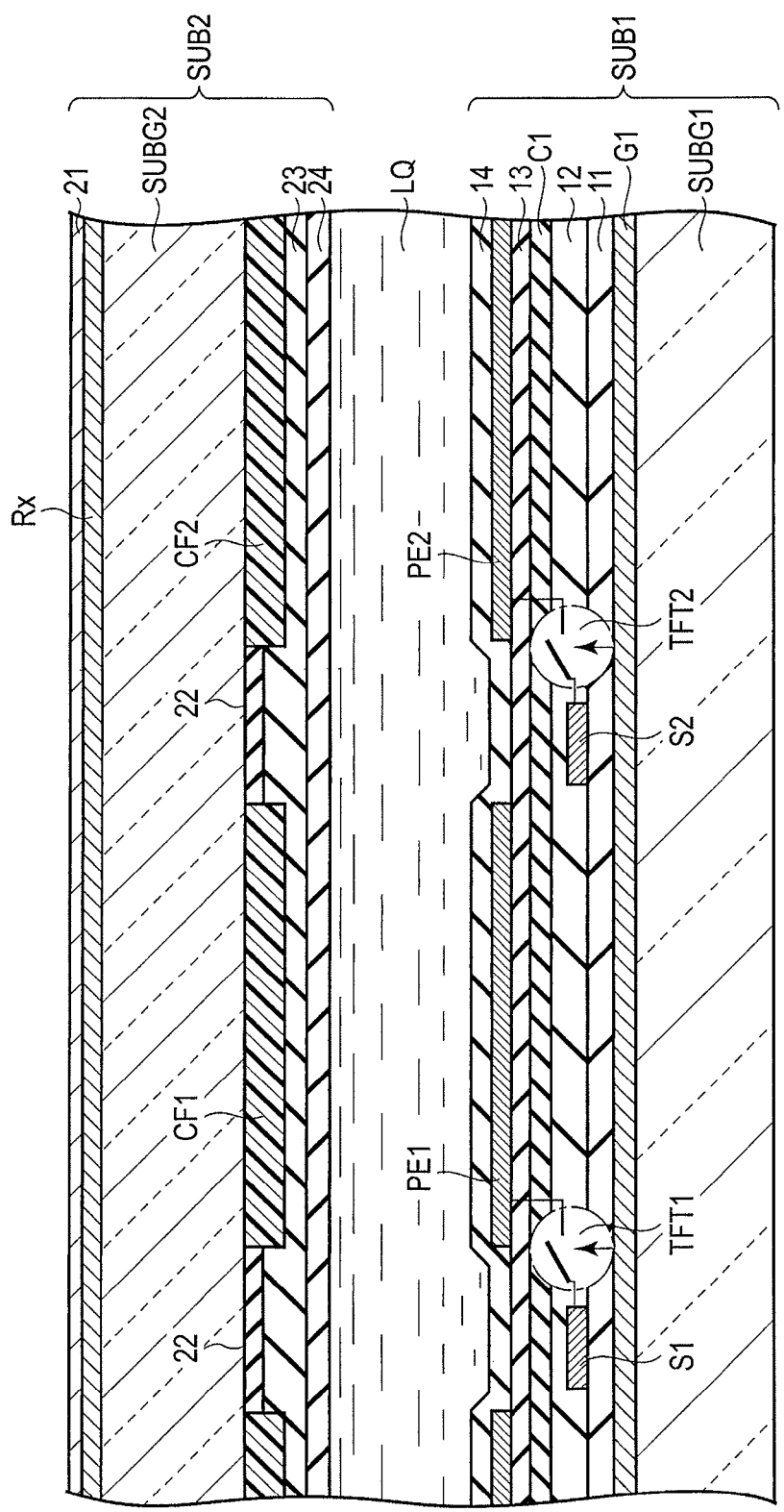
FIG. 5B is a simplified cross-sectional view of part of the display device showing a positional relationship between common electrodes, pixel electrodes and detection electrodes.

Positional coordinates of the finger can be determined based on timings of driving the common electrodes C (C1, C2, C3, . . . ) and a position of a touch detection electrode Rx that outputs a detection signal Rxs of a low level. FIG. 5B is a simplified cross-sectional view of part of the display device showing a positional relationship between the common electrodes, the pixel electrodes and the detection electrodes. FIG. 5B shows the vicinity of a scan line G1 and signal lines S1 and S2 of FIG. 3. A liquid crystal layer LQ is located between the first substrate SUB1 of pixels and the second substrate SUB2. In the first substrate SUB1, scan line G1 is formed on the liquid crystal layer LQ side of a glass substrate SUBG1. Scan line G1 is covered with an insulating layer 11. Signal lines S1 and S2 are formed on the liquid crystal layer LQ side of the insulating layer 11. Signal lines S1 and S2 are covered with an insulating layer 12. The common electrode C1 is formed on the liquid crystal layer LQ side of the insulating layer 12. Pixel electrodes PE1 and PE2 are formed on the liquid crystal layer LQ side of the common electrode C1 through an insulating layer 13. Pixel electrodes PE1 and PE2 are covered with an alignment film 14. A transistor TFT1 formed across the insulating layers 11 and 12 is brought into or out of conduction by a timing pulse from scan line G1 between signal line S1 and pixel electrode PE1. A transistor TFT2 is brought into or out of conduction by a timing pulse from scan line G1 between signal line S2 and pixel electrode PE2. Transistors TFT1 and TFT2 are formed of a semiconductor layer but are schematically shown as the shape of a switch in FIG. 5B.

In a glass substrate SUBG2 constituting the second substrate SUB2, the touch detection electrode Rx is formed on the opposite side of the liquid crystal layer LQ and covered with a protective layer 21. On the liquid crystal layer LQ side of glass substrate SUBG2, color filters CF1 and CF2 are formed to correspond to pixel electrodes PE1 and PE2, respectively. A light-shielding film (black matrix) 22 is formed between color filters CF1 and CF2 to prevent an unnecessary light leak. An overcoat layer 23 is formed on the liquid crystal layer LQ side of color filters CF1 and CF2 and the light-shielding film 22. An alignment film 24 is formed on the liquid crystal layer LQ side of the overcoat layer 23. The color filters CF may be formed on glass substrate SUBG1.

Figure 6:
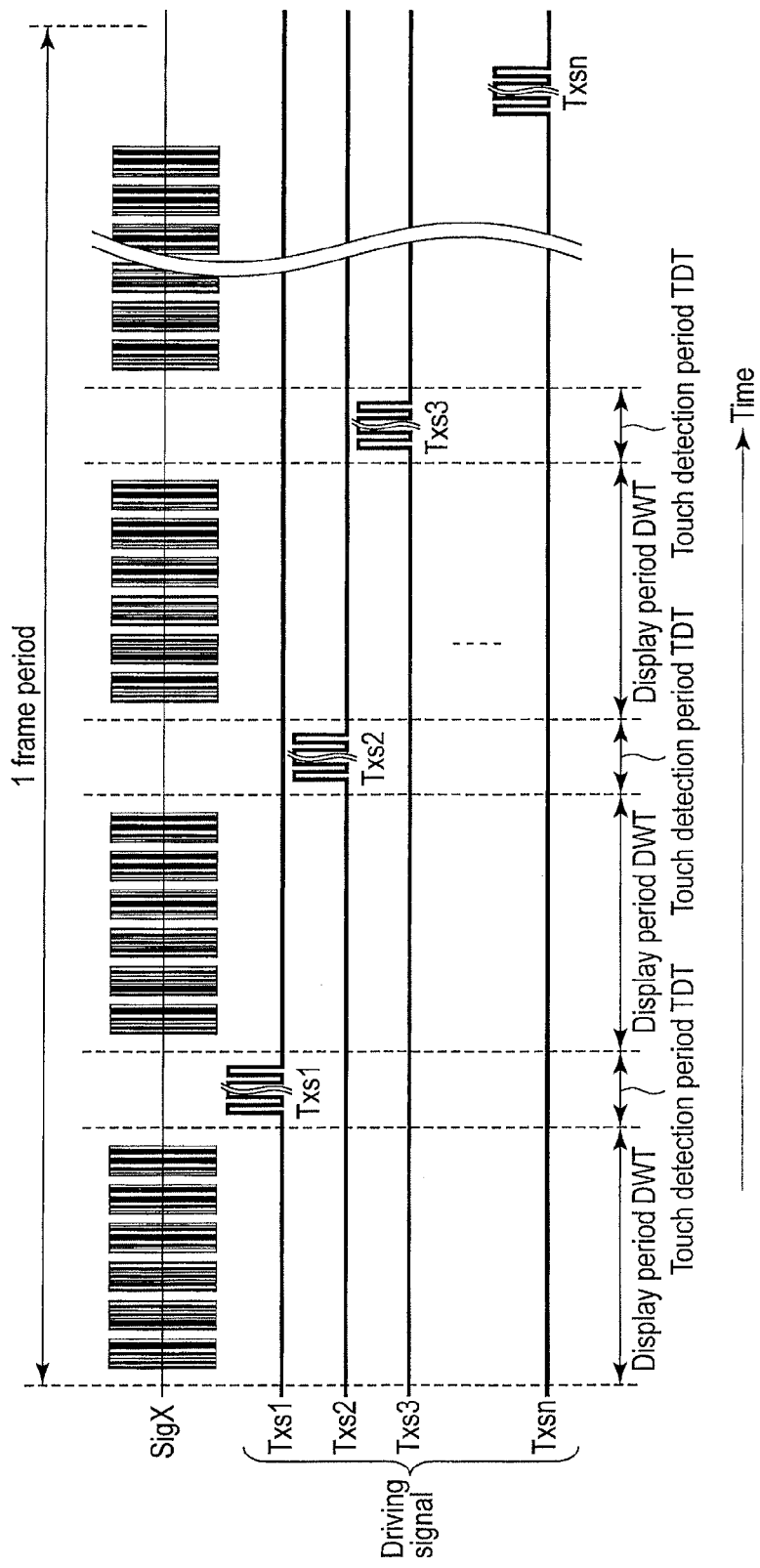
FIG. 6 is a timing chart showing a relationship between driving periods of the touch detection system SE of FIG. 5A and display periods of the display panel.

FIG. 6 shows a timing chart when the common electrodes C (C1, C2, C3, . . . ) are driven by driving signals Txs1, Txs2, Txs3, . . . . As shown in FIG. 6, one frame period is divided into display periods DWT (including a period of writing pixel signal SigX), and touch detection periods (also called non-display periods) TDT are provided between the display periods DWT. During the touch detection periods TDT, the common electrodes C (C1, C2, C3, . . . ) are driven by driving signals Txs1, Txs2, Txs3, . . . (FIG. 5A).

If the user's finger, etc., is close to the display surface when the common electrodes C (C1, C2, C3, . . . ) are driven by driving signals Txs1, Txs2, Txs3, . . . , a detection signal Rxs of a low level is detected from a touch detection electrode Rx corresponding to the position of the finger. As shown in FIG. 6, the display periods DWT and the touch detection periods TDT are distributed in one frame period. In other words, the display periods DWT and the touch detection periods TDT are time-shared in one frame period. The basic structure and operation of the touch detection system SE have been described above.

Figure 7:
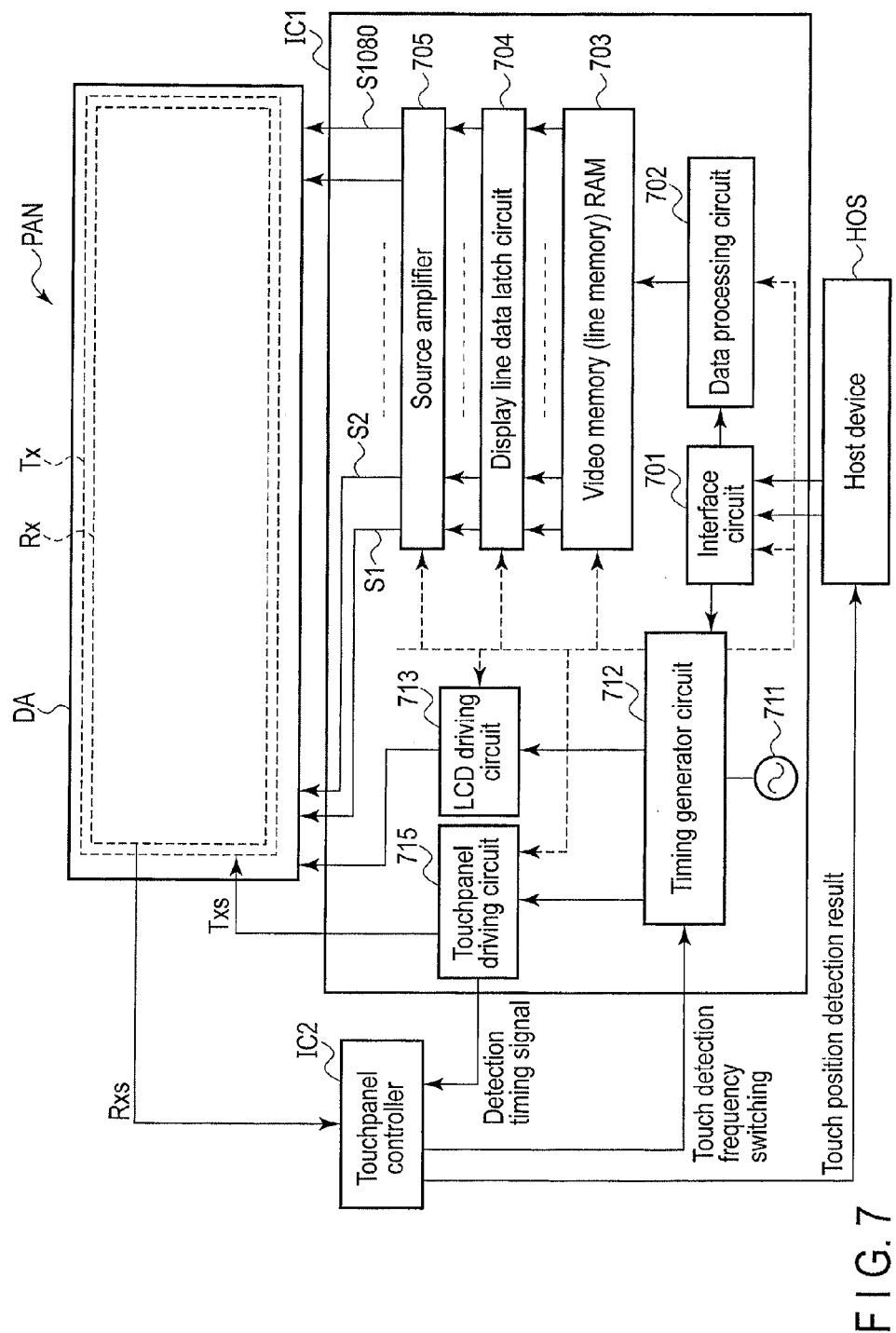
FIG. 7 is an illustration showing a main circuit block of FIG. 1 and the inside of a panel driver IC1.

FIG. 7 is an illustration showing a main circuit block of FIG. 1 and the inside of the panel driver IC1. Pixel data, a synchronization signal and the like are output from the host device HOS. The pixel data and the synchronization signal are received in an interface circuit 701.

The pixel data received in the interface circuit 701 is input to a data processing circuit 702 and subjected to data interpolation and/or synthesis so as to conform to the display by the display panel PAN. A timing generator circuit 712 receives a vertical synchronization signal and/or a horizontal synchronization signal. The timing generator circuit 712 includes a phase control circuit, and maintains the relationship between a clock (internal clock) phase of an internal oscillator 711 and a phase of an external synchronization signal in a predetermined relationship. The timing generator circuit 712 generates an internal horizontal synchronizing pulse and an internal vertical synchronizing pulse based on the internal clock.

The internal horizontal synchronizing pulse, the internal vertical synchronizing pulse and various timing pulses for driving are input to an LCD driving circuit 713 and a touchpanel driving circuit 715. The timing generator circuit 712 generates and supplies a timing pulse for each of the interface circuit 701, the data processing circuit 702, a video memory 703, a display line data latch circuit 704 and a source amplifier 705. Each block in the panel driver IC1 is thereby uniformly controlled. Thus, the timing generator circuit 712 can also be called a control unit of the panel driver IC1.

The pixel data output from the data processing circuit 702 is stored in the video memory 703. The image data output from the video memory 703 is latched into the display line data latch circuit 704. The pixel data latched into the display line data latch circuit 704 is subjected to analog conversion in the source amplifier 705 and thereby becomes pixel signals. The pixel signals are subjected to gamma correction and then supplied to the display panel. These pixel signals are written to pixels whose gates are open through signal lines S1 to Sm.

The LCD driving circuit 713 can control the source selection circuit MUP and the gate circuit GD (not shown) based on a timing signal from the timing generator circuit 712 to designate a line to which a pixel signal is written. The touchpanel driving circuit 715 supplies the driving signals Txs shown in FIG. 5A and FIG. 6 to the common electrodes C (C1, C2, . . . ) via the common electrode driving circuit CD in allocated time. Touch detection signals Rxs are thereby output from the touch detection electrodes Rx.

The touch detection signals Rxs are input to the touchpanel controller 102. The touchpanel controller 102 determines a touch position based on a temporal relevance between driving timings of the driving signals Txs and detection timings of the touch detection signals Rxs. A determination result of the touch position is input to the host device HOS. After determining the touch position, the host device HOS executes the subsequent program operation based on the determination result.

The touchpanel controller 102 can supply a switching signal of a touch detection frequency (also called a condition signal) to the timing generator circuit 712. For example, when a touch detection signal Rxs of a predetermined level cannot be obtained in normal operation, the touchpanel controller 102 provides the timing generator circuit 712 with a switching signal to set the touch detection frequency to 120 Hz. The touch detection frequency is a frequency of scanning the display surface (touch operation surface) in one frame period (60 Hz). If any noise (touch detection signal Rxs) is detected, the touchpanel controller IC2 supplies a switching signal of the touch detection frequency to the timing generator circuit 712. In response to the switching signal, the touchpanel controller 102 controls the touchpanel driving circuit 715 to set the touch detection frequency to 60 Hz. Since the length of touch detection time can be increased, the sensitivity of touch detection can be improved. If the touch detection signal is not input for a certain time, the touchpanel controller 102 can set the touch detection frequency to 120 Hz through the timing generator circuit 712. In this manner, the touch detection frequency is often switched depending on conditions in the device of the present embodiment. Further, if the touch detection signal is not obtained for a long time, the system may shift into a sleep mode.

Figure 8:
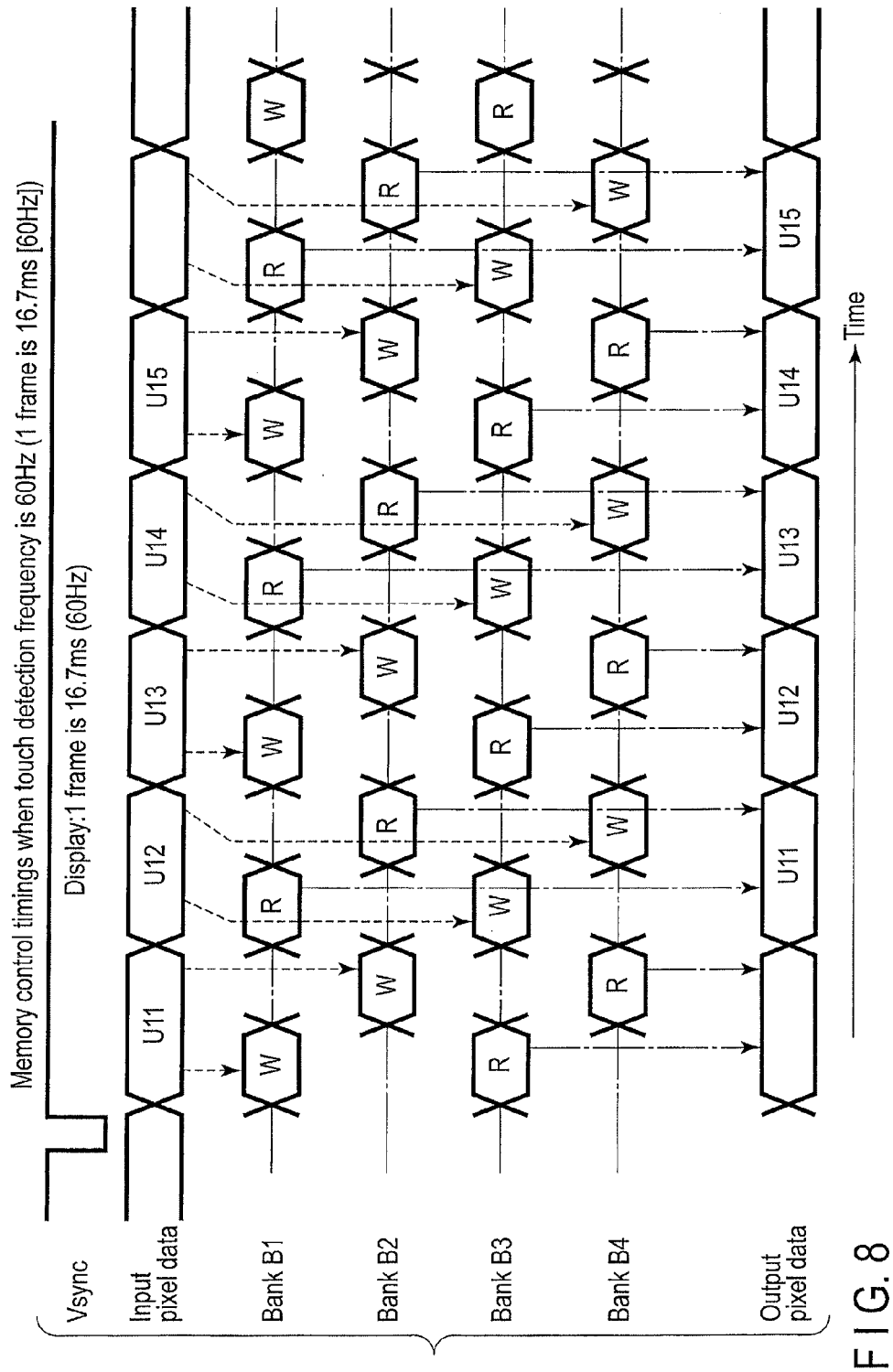
FIG. 8 is a timing chart showing a situation where data is written to and read from a video memory when a touch detection frequency is 60 Hz in the embodiment.

FIG. 8 is a timing chart of write and read in memory space (banks set in a memory) of the video memory 703 when the touch detection frequency is 60 Hz. In FIG. 8, W means write and R means read. Each of Unn, Un1, Un2, ... is a unit, i.e., a group of sets of consecutive pixel data. Each of units is also meant a write period of the pixel data to be consecutively written to the memory. FIG. 8 shows a situation where pixel data is written to each of banks B1, B2, B2 and B4 of the video memory 703 per unit in synchronization with the vertical synchronization signal Vsync, and the written data per unit is read from each of the banks B1, B2, B2 and B4.

In the present embodiment, for example, the above four banks are set to manage address space of the video memory 703. The address space is managed by, for example, a write address and a read address generated by the timing generator circuit 712. A data capacity of one bank corresponds to lines LN0 of consecutive pixel data. That is, the amount of pixel data written to horizontal lines LN0 of the display unit (this may be called the display area, or the display panel) corresponds to one bank.

One unit and the number of lines of one unit are hereinafter described in detail. When the touch detection frequency is, for example, 60 Hz, the common electrodes C (C1, C2, C3, ...) shown in FIG. 5A are scanned once every 1/60 second (one frame period). As shown in FIG. 6, the touch detection periods and the display periods are time-shared in one frame period. For example, a time from driving the first common electrode C1 shown in FIG. 5A by a driving signal Txs1 to driving the second common electrode C2 by a driving signal Txs2 corresponds to a time including a display period. A time during which one common electrode is driven by a touch driving signal corresponds to a touch detection period. Thus, the display period is determined according to the number of the common electrodes C (C1, C2, C3, ...) and a time corresponding to one frame, and the number of lines included in one unit is also determined according to the time interval (display period).

The description returns to FIG. 8. The pixel data is written to the video memory 703 per unit in synchronization with the vertical synchronization signal Vsync. It is assumed that a line number of one unit is LN1, the address space of the video memory 703 is managed by using four banks B1, B2, B3 and B4, and the line number LN1 of one unit is twice as large as the line number LN0 of one bank (LN1=2×LN0). Write and read operation to the four banks B1, B2, B3 and B4, which are the address space of the video memory 703, is hereinafter described on the above assumption. In the description below, one unit has the line number twice as large as LN0, but the line number may be n times as large as LN0 (n is a positive integer greater than or equal to two).

In the description below, one unit in the case of a touch detection period of low frequency is indicated by Uln (a plurality of first units) and one unit in the case of a touch detection period of high frequency is indicated by Usn (a plurality of second unit). And Each of the first units is meant a write period or a write number of the pixel data to be consecutively written to the memory when the scanning frequency is the first frequency. Each of the second units is also meant a write period or a write number of the pixel data to be consecutively written to the memory when the scanning frequency is the second frequency.

The first half of the first unit Ul1 is written to bank B1 and the second half is written to bank B2. While the first half of unit Ulf is written to bank B1, data of bank B3 is read. The data read from bank B3 is data of the first half of a unit Uln preceding unit Ul1. While the second half of unit Ul1 is written to bank B2, data of bank B4 is read. The data read from bank B4 is data of the second half of unit Uln preceding unit Ul1.

The first half of a unit Ul2 following unit Ul1 is written to bank B3 and the second half is written to bank B4. While the first half of unit Ul2 is written to bank B3, data of bank B1 is read. The data read from bank B1 is data of the first half of unit Ul1. While the second half of unit Ul2 is written to bank B4, data of bank B2 is read. The data read from bank B2 is data of the second half of unit Ul1. The pixel data is written to and read from the video memory 703 by repeating the above procedure.

Figure 9:
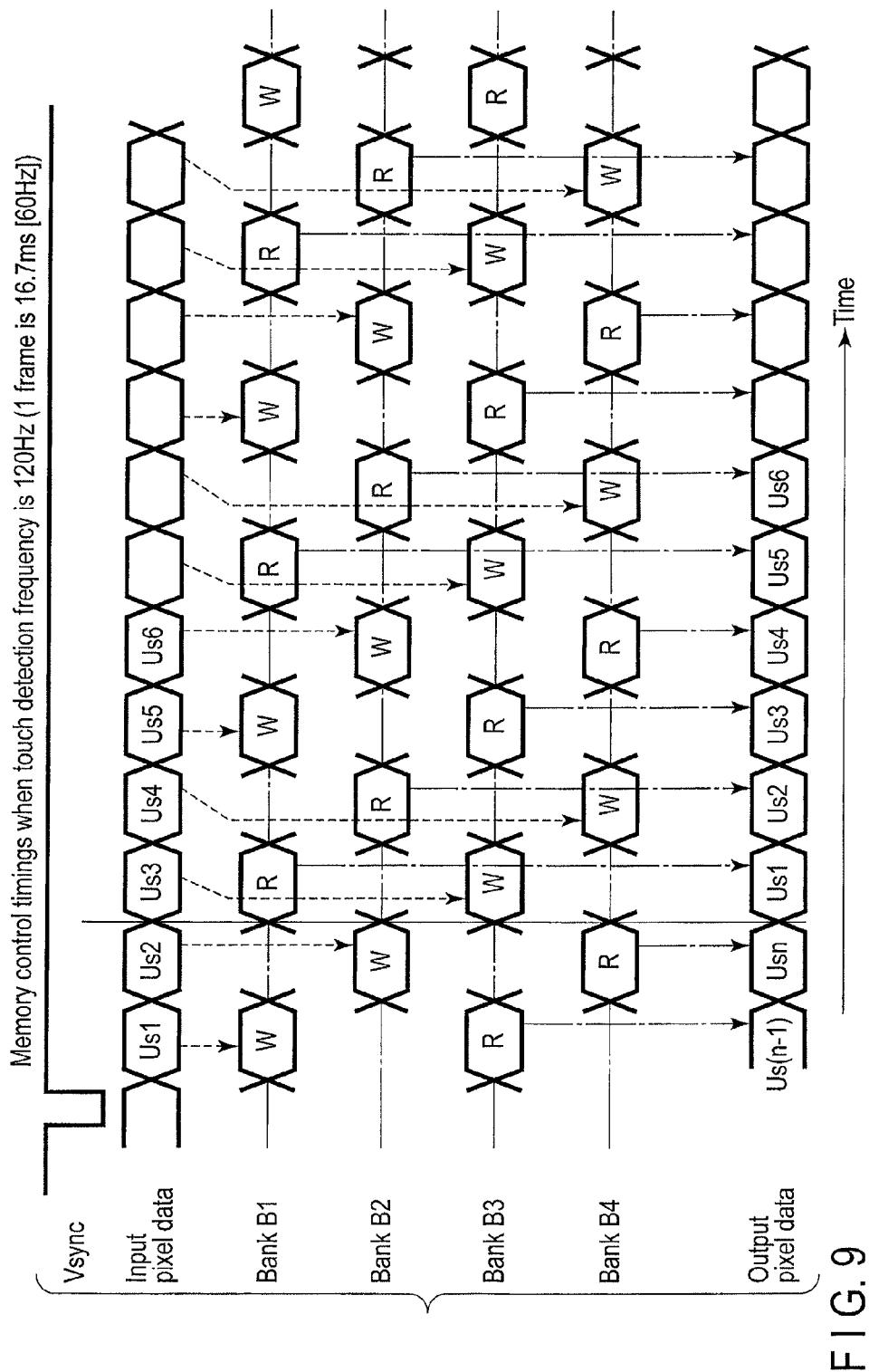
FIG. 9 is a timing chart showing a situation where data is written to and read from the video memory when the touch detection frequency is 120 Hz in the embodiment.

FIG. 9 shows a timing chart when the touch detection frequency is 120 Hz. In this case, a line number LN2 included in one unit is half the line number in the case of FIG. 8 in order to switch the touch detection frequency to 120 Hz. Further, in this case, the number of divisions in one frame increases since the touch detection frequency is increased but a display frequency remains at 60 Hz in a V-blanking drive system where a unit display period and a unit touch period are alternately provided (FIG. 6). As a result, the line number of a display signal in the unit display period (one unit) is reduced. Since the number of boundary of the units (parts of between of the units) can be twice as large as in the case of FIG. 8, the touch detection frequency can be set to 120 Hz. At this time, the line number LN2 of one unit is equal to the line number LN0 of one bank. That is, on the other condition (where the touch detection frequency is 120 Hz), LN2=LN0.

The pixel data is written to the video memory 703 per unit in synchronization with the vertical synchronization signal Vsync. At this time, the line number LN2 of one unit=(LN1/2)=LH0. Write and read operation to the four banks B1, B2, B3 and B4, which are the address space of the video memory 703, is hereinafter described on the above assumption.

The first unit Us1 is written to bank B1. While unit Us1 is written to bank B1, data of bank B3 is read. The next unit Us2 is written to bank B2. While unit Un2 is written to bank B2, data of bank B4 is read.

The data read from bank B4 is data of a unit Usn preceding unit Us1. The data read from bank B3 is data of a unit Us(n−1) preceding unit Usn.

The next unit Us3 is written to bank B3. While unit Us3 is written to bank B3, data of bank B1 is read. The next unit Us4 is written to bank B4. While unit Us4 is written to bank B4, data of bank B2 is read. The pixel data is written to and read from the video memory 703 by repeating the above procedure.

As described above, a unit to be processed is switched between small and large in the device of the present embodiment. Several banks are set in the video memory 703 to which a unit is written and from which a unit is read. The data capacity of one bank is set to be equal to the data capacity of the minimum unit. Therefore, data can be read from the video memory without any defect even if the size of one unit is changed. As a result, the video memory need not have the capacity of one frame and may be a small memory having the capacity less than one frame. In addition, the touch detection frequency can be switched without image distortion even if the size of one unit is changed, which is hereinafter described.

Figure 10:
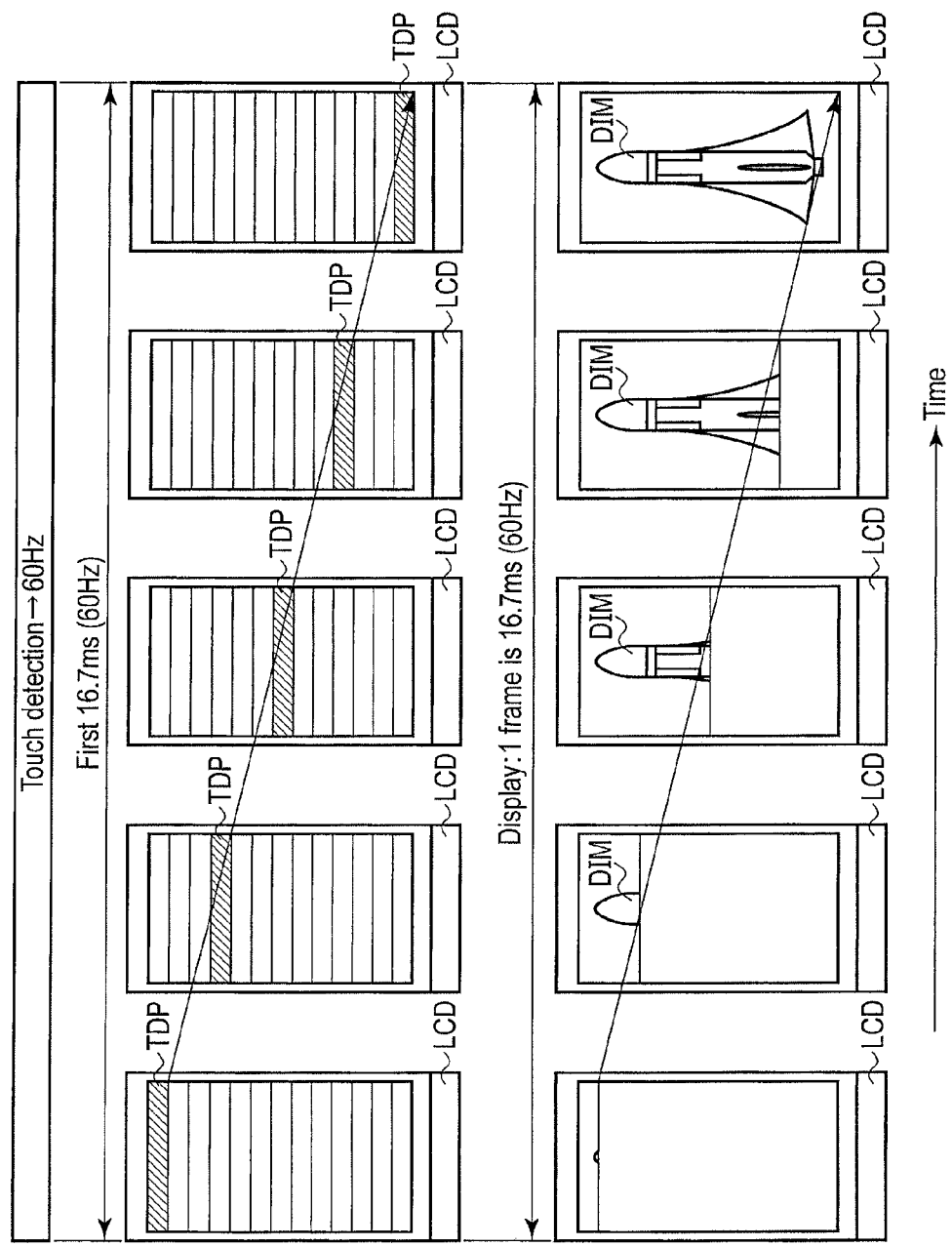
FIG. 10 is a timing chart showing a situation where a touch detection position is changed and a display image is scanned on a screen of the display panel when the touch detection frequency is 60 Hz in the embodiment.

FIG. 10 is a timing chart showing a situation where a touch detection position TDP is changed and a display image DIM is scanned and displayed on a screen of the display panel PAN when the touch detection frequency is 60 Hz in the embodiment. The touch detection position TDP is moved from the top to the bottom of the screen and this movement is repeated. The frequency of the repetition is 60 Hz. An entire display image DIM of one frame is displayed by once scanning the one frame. The scanning frequency is 60 Hz. In FIG. 10, when one frame is scanned, the detection electrodes and/or scan lines 1, 2, 3, 4, 5, 6, 7, 8, . . . are sequentially scanned in this order. However, the scan order is not limited to this. For example, the scan may be performed in the other order of, for example, 1, 3, 2, 4, 6, 5, 8, 7, . . . .

Figure 11:
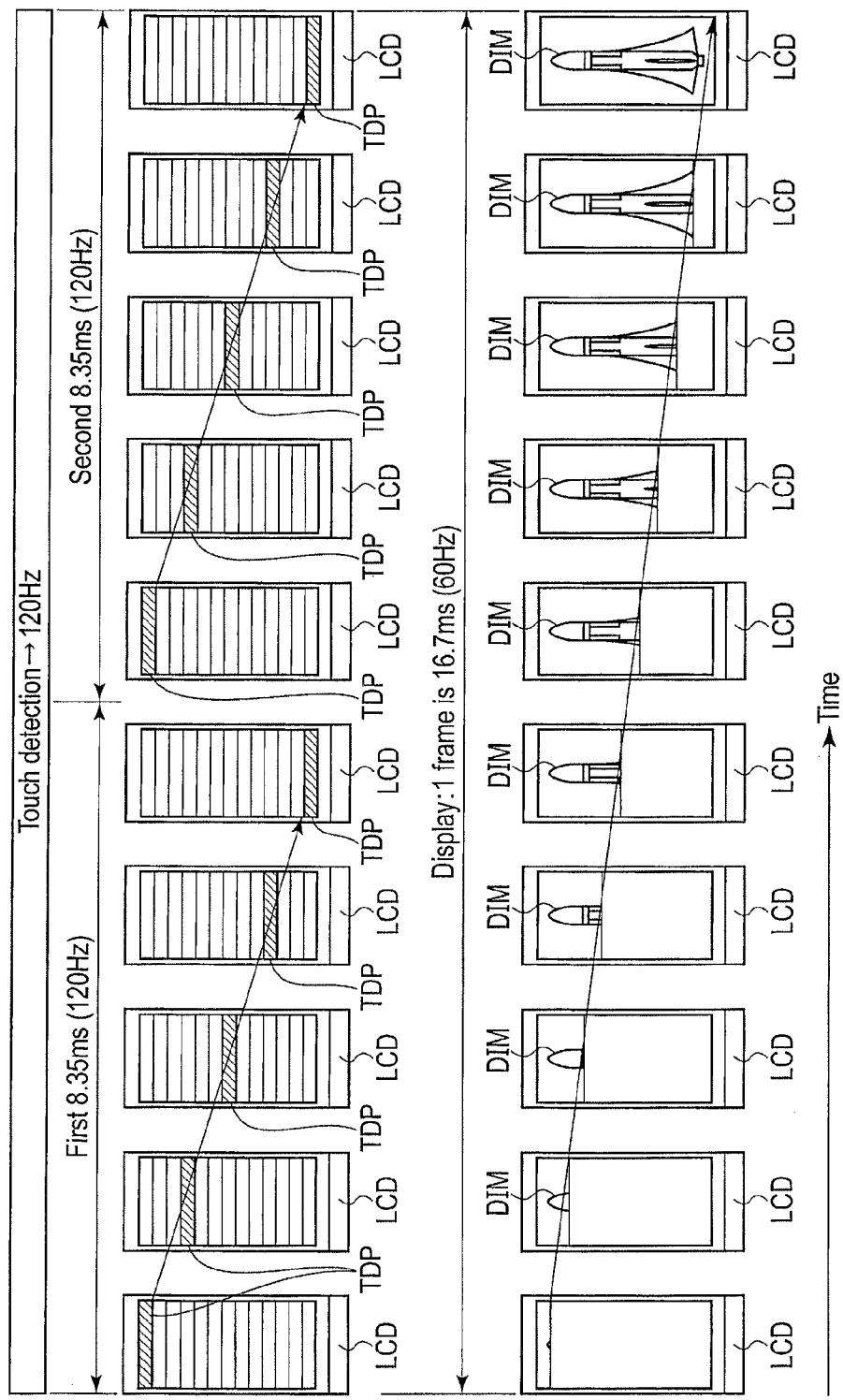
FIG. 11 is a timing chart showing a situation where the touch detection position is changed and the display image is scanned on the screen of the display panel when the touch detection frequency is 120 Hz in the embodiment.

FIG. 11 is a timing chart showing a situation where a touch detection position TDP is changed and a display image is scanned and displayed on the screen of the display panel when the touch detection frequency is 120 Hz in the embodiment. The touch detection position TDP is moved from the top to the bottom of the screen twice a frame period and this movement is repeated. The frequency of the repetition is 120 Hz. An entire display image DIM of one frame is displayed by once scanning the one frame. The scanning frequency is 60 Hz. In the operation shown in FIG. 11, too, the scan order of the detection electrodes and/or the scan lines are not limited to the order of 1, 2, 3, 4, 5, 6, 7, 8, . . . , as in the case of FIG. 10. For example, the scan may be performed in the other order of, for example, 1, 3, 2, 4, 6, 5, 8, 7, . . . .

Figure 12:
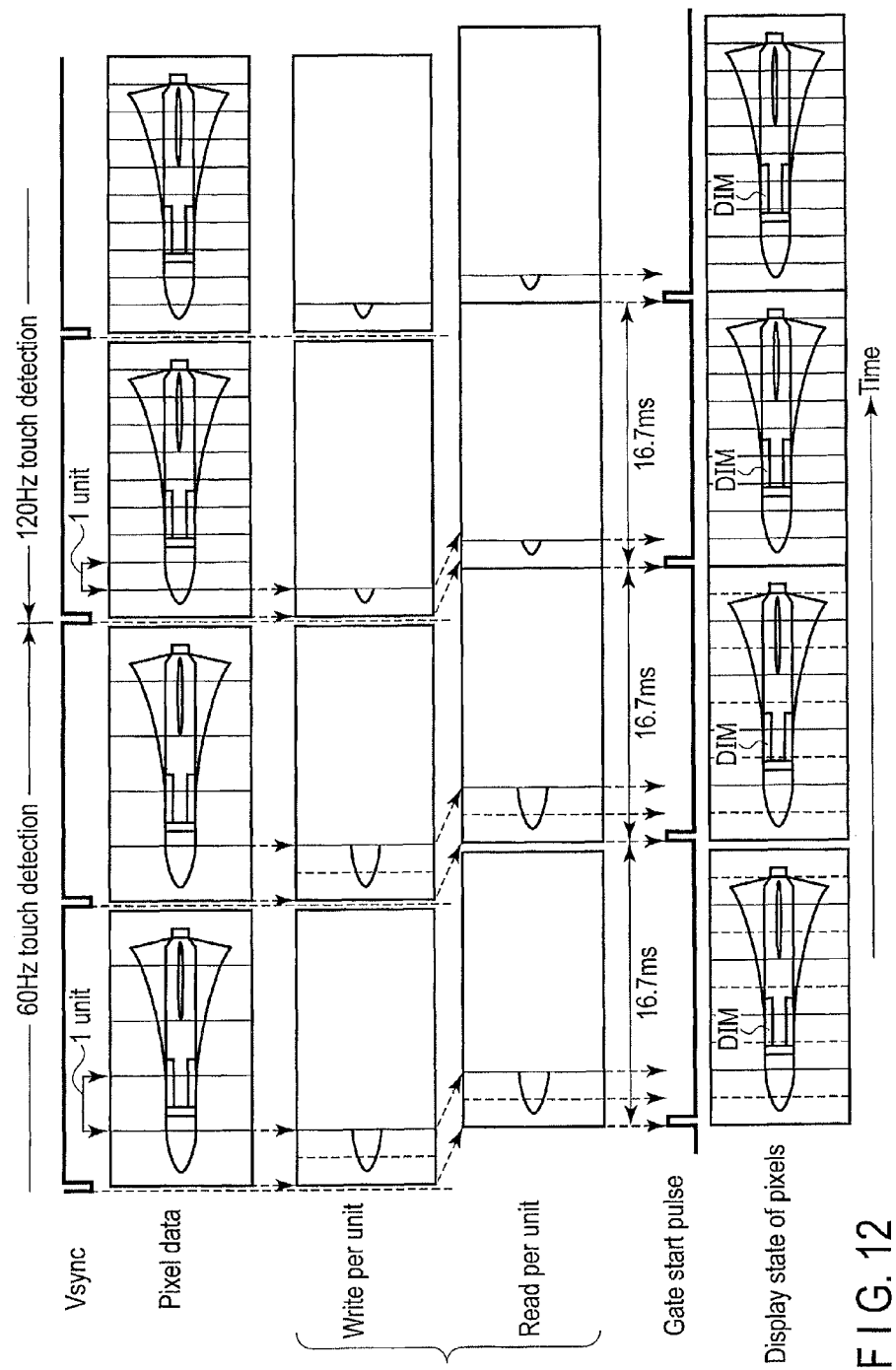
FIG. 12 is an illustration showing a situation where pixel data is written to and read from the video memory and the read pixel data is displayed when the touch detection frequency is changed from 60 Hz to 120 Hz in the embodiment.

FIG. 12 shows a state of pixel data, a state of writing image to and reading image from the video memory and a state of a display image DIM when the touch detection frequency is changed from 60 Hz to 120 Hz. FIG. 12 also shows a gate start pulse for achieving vertical synchronization of display. In the present embodiment, pixel data is written to the video memory 703 per unit. The size of the unit is changed from large to small when the touch detection frequency is changed from 60 Hz to 120 Hz. At this time, the address space of the video memory 703 is managed by four banks B1, B2, B3 and B4. The line number (data capacity) LN0 of one bank is not changed even if the touch detection frequency is changed from 60 Hz to 120 Hz.

Accordingly, an initial phase of a frame is not changed when the touch detection frequency is switched in the present embodiment. Therefore, a display status of the image DIM is stable when the touch detection frequency is changed from 60 Hz to 120 Hz. That is, the image DIM is stably displayed without any defect at a changing point of frequency.

Figure 14:
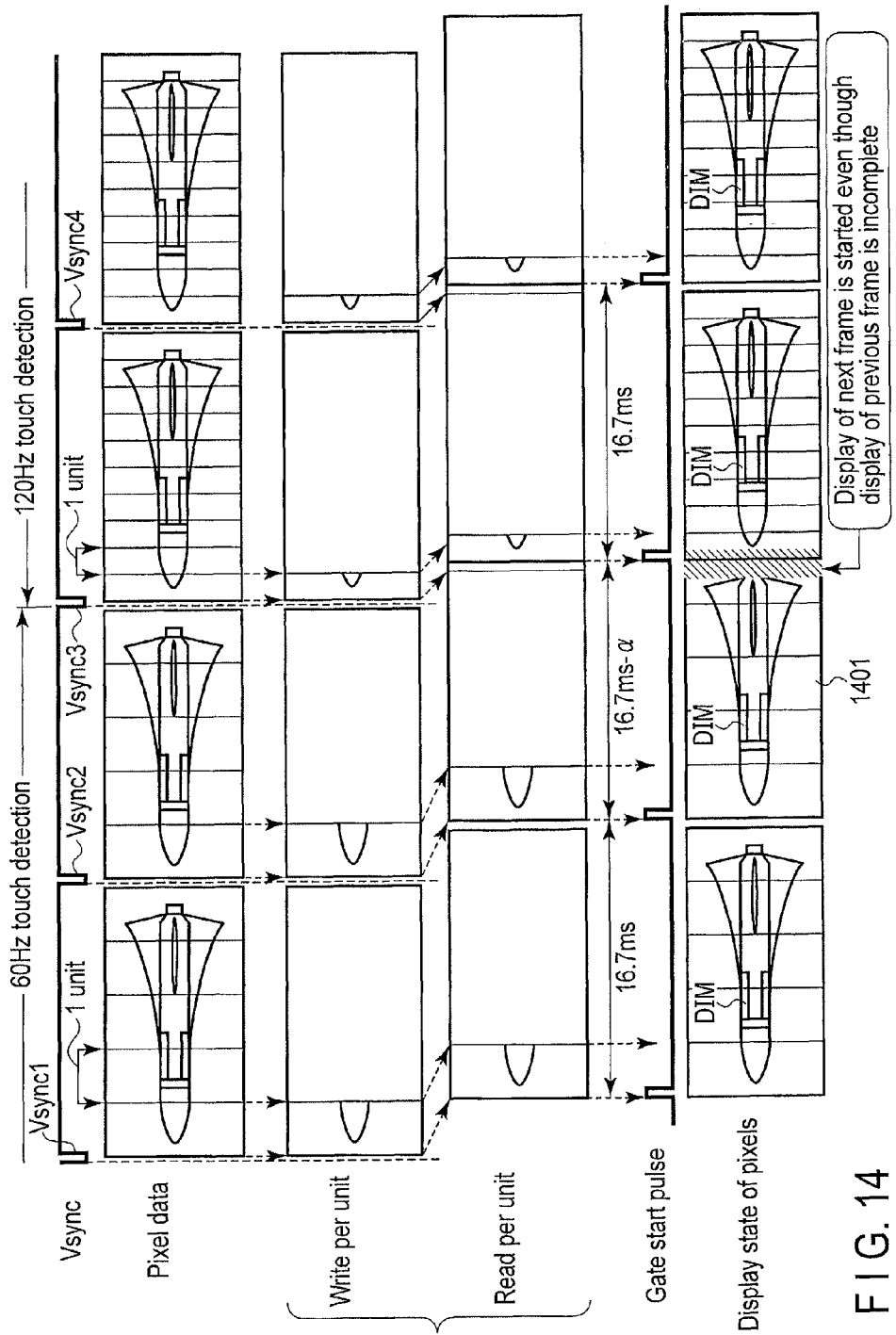
FIG. 14 is an illustration to be compared with FIG. 12 and showing a situation where pixel data is written to and read from the video memory and the read pixel data is displayed.

The above-mentioned effect is understood by the following explanations by using comparative examples of FIG. 13 and FIG. 14. The relationship between the line number of one unit and the line number of one bank in the comparative example is different from the relationship in the above-described example. For example, a case where the line number of one bank is changed is described.

FIG. 13 shows an example in which the video memory has two banks and the line number of one bank is changed in accordance with the change of the touch detection frequency from 60 Hz to 120 Hz. One unit of input pixel data is changed from a large unit U1 to a small unit Us in accordance with the change of the touch detection frequency from 60 Hz to 120 Hz as in the case of FIG. 8 and FIG. 9.

In the example of FIG. 13, a bank data capacity (line number) of one bank is changed from large to small in accordance with the change of the touch detection frequency from 60 Hz to 120 Hz. The memory control operation after time t1 is hereinafter described. Pixel data Im-1 is written to bank B2. At this time, data of bank B1 is read and displayed. Next, pixel data Im-2 (including a square shape in the first half and a circular shape in the second half) is written to bank B1. At this time, data of bank B2 is read and displayed.

It is assumed that the touch detection frequency is changed from 60 Hz to 120 Hz (at the position of Vsync3) after pixel data Im-2 is written to bank B1. In accordance with the change, one unit is also switched to a small unit Us and then pixel data Im-3 is input. Pixel data Im-3 is written to bank B2.

At the same time, data of bank B1 is read. In the current frame, one unit is switched to a small unit Us and the operation is executed in synchronization with the small unit Us. In other words, writing of pixel data Im-3 to bank B2 is completed while pixel data Im-2 is read from bank B1. Therefore, pixel data Im-4 following pixel data Im-3 needs to be written to any bank and overwriting of bank B1 with pixel data following pixel data Im-3 is started. That is, the gate start pulse for display is started earlier than in the case of 60 Hz. Accordingly, the first half of the data written to bank B1 is read. As a result, only the square shape in the first half of pixel data Im-2 is read as output pixel data and the circular shape cannot be displayed. Therefore, if the bank data capacity (line number) of one bank is changed from large to small in accordance with the change of the touch detection frequency from 60 Hz to 120 Hz, a defect occurs in the displayed image at the time of the change.

FIG. 14 shows an example of an image based on pixel data. In FIG. 14, the touch detection frequency is changed from 60 Hz to 120 Hz by the horizontal synchronization signal Vsync3. Vertical synchronization signals Vsync1 to Vsync3 are shown. FIG. 14 shows input pixel data, a process of reading the pixel data from the data processing circuit and writing the read pixel data to the video memory, a process of reading the pixel data from the video memory and a process of displaying an image by the display unit.

In this operation, one unit written from the data processing circuit to the video memory is changed from large to small. The line number of pixel data of one unit is reduced by half after the horizontal synchronization signal Vsync3. That is, the size of one unit written to and read from the video memory is changed from large to small.

In this case, one small unit Us of the next frame is written to the video memory before a reading completion timing of one large unit Ul. As a result, part of the second half (right side in FIG. 14) of the image of the previous frame is not displayed as described above with reference to FIG. 13. In FIG. 14, part of the display image is not displayed in the second half of frame 1401.

In contrast, stable display can be achieved without any problem according to the embodiment described with reference to FIG. 7 to FIG. 12.

Figure 15:
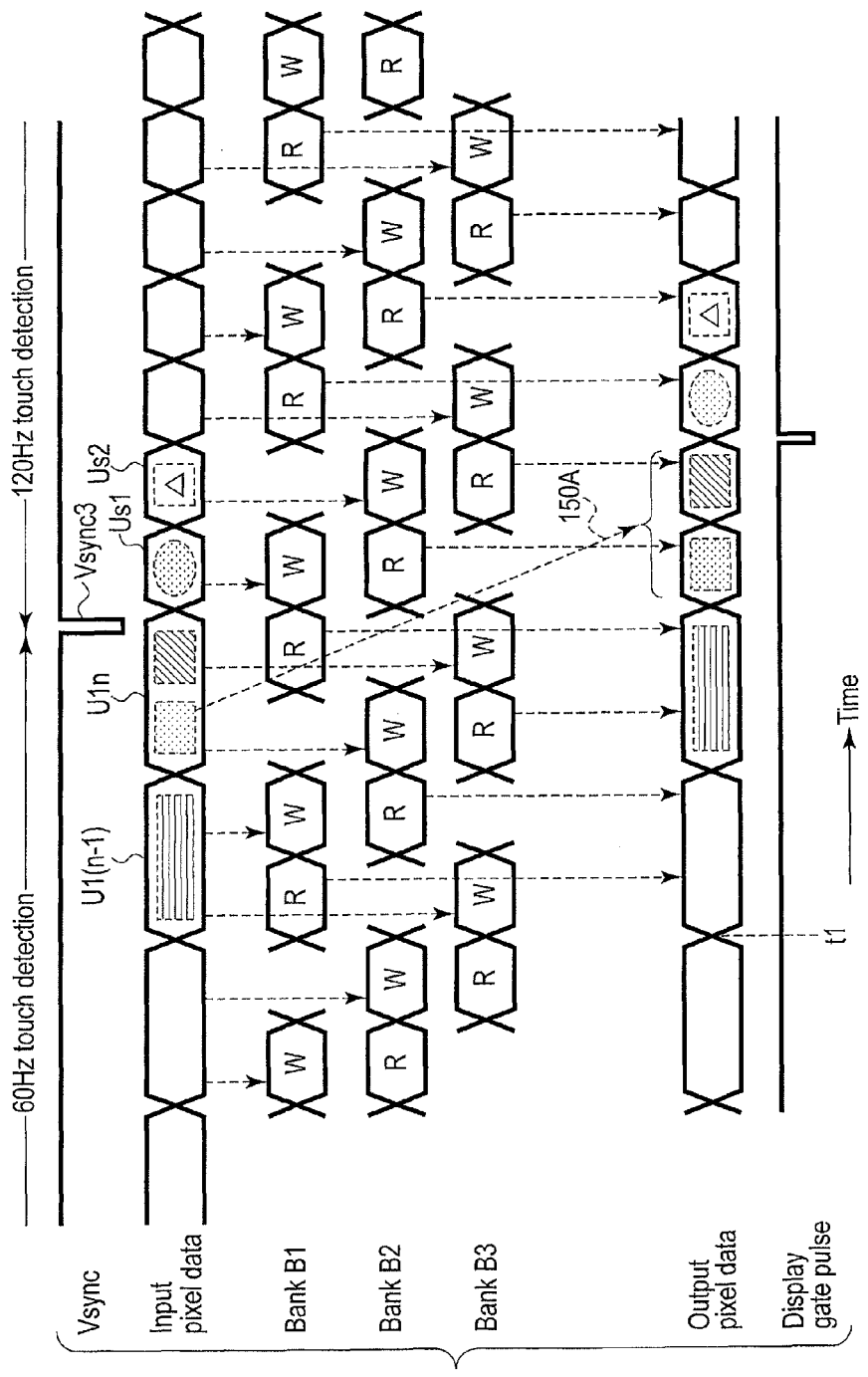
FIG. 15 is an illustration of another embodiment showing timings of writing and reading pixel data in the video memory and an image of output pixel data when the touch detection frequency is changed from 60 Hz to 120 Hz and a data capacity of each of the three banks is fixed.

FIG. 15 shows another embodiment. Four banks are provided to manage the video memory 703 in the above-described embodiment, but three banks are provided in the present embodiment as shown in FIG. 15. In FIG. 15, the first bank B1, the second bank B2 and the third bank B3 are subjected to write and read control with respect to each unit (large) as described below. As a representative, units Ul(n−1) and Uln and banks that process these units are described.

In the first bank B1, data is read (R) in the first half of unit Ul(n−1), written (W) in the second half of unit Uln, maintained in the first half of the next unit Uln and read (R) in the second half of unit Uln, which is repeated for the following units.

In the second bank B2, data is maintained in the first half of unit Ul(n−1), read (R) in the second half of unit Ul(n−1), written (W) in the first half of the next unit Un and maintained in the second half of unit Un, which is repeated for the following units.

In the third bank B3, data is written (W) in the first half of unit Ul(n−1), maintain of unit Un-led in the second half of unit Ul(n−1), read (R) in the first half of the next unit Uln and written (W) in the second half of unit Uln, which is repeated for the following units.

It is assumed that the unit is switched to unit Us1 at the time of the vertical synchronization signal Vsync3 and then units Us2, Us3, Us4, . . . are processed.

Several banks are allocated in the video memory, and a fixed line number of consecutive pixel data of one bank is LN0. One unit, which is a group of lines of pixel data to be consecutively written to the video memory, is switched between large and small in accordance with a change of the touch detection frequency.

When the touch detection frequency of 60 Hz is adopted, the line number (LN1) of one unit is switched to the line number (LNx1=LN1=LN0×n) n times larger than the fixed line number (LN0) (n is an integer greater than or equal to two). When the touch detection frequency of 120 Hz is adopted, the line number (LN2) of one unit is switched to the line number (LNx2=LN2=LN0) equal to the fixed line number (LN0). When the line number (LN1) of one unit is n times larger than the fixed line number (LN0), the following definitions can be formulated:

(i) In the case of low-frequency operation, n banks are required for writing lines corresponding to one unit to banks each having the fixed line number (LN0) conforming to the case of high frequency operation.

(ii) After writing of one unit is finished, writing of the next unit should be executed while reading at least one of the banks of the written unit.

(iii) Accordingly, the minimum number of required banks is n+1 (in the case of switching the frequency in two levels).

In the present embodiment, too, the touch detection frequency can be changed from 60 Hz to 120 Hz without any display defect of pixel data. The pixel data of unit U2 is displayed without lacking the last part as shown by arrow 150A.

According to the present embodiment, the capacity of the video memory can be less than that of the frame memory. The touch detection frequency can be switched between 60 Hz and 120 Hz. Even if the touch detection frequency is switched, no defect occurs in the display image.

In the above-described embodiments, the scanning frequency for touch detection is switched between 60 Hz and 120 Hz to simplify the explanation. However, the scanning frequency for touch detection is not limited to these embodiments and may be less than 60 Hz, between 60 Hz and 120 Hz or greater than 120 Hz. In addition, the scanning frequency is not necessarily switched in two levels and may be switched in multiple levels more than two. For example, the scanning frequency may be switched between 45 Hz and 90 Hz. The scanning frequency may also be switched between 45 Hz, 60 Hz, 90 Hz and 120 Hz.

In this case, the scanning frequency for touch detection can be increased by dividing the line number of a large unit Ul. For example, it is assumed that the maximum line number when the touch detection frequency is 45 Hz is W1. When switching the touch detection frequency from 45 Hz to 60 Hz, the line number of one unit is changed to W1×45/60. When switching the touch detection frequency from 45 Hz to 90 Hz, the line number of one unit is changed to W1×45/90. When switching the touch detection frequency to 120 Hz, the line number of one unit is changed to W1×45/120. If the calculated line number has a decimal fraction, the fractional portion of the line number is dropped at the beginning or end of the frame. The number of managed banks may be changed by the controller. However, if the frequency is switched in two levels and the higher frequency is n times greater than the lower frequency as in the case of switching between 60 Hz and 120 Hz, the line number of one unit in the case of low frequency can be easily calculated by just multiplying the line number of one unit in the case of high frequency by n.

Next, a case where the touch detection frequency is switched in two levels but the higher frequency is not an integral multiple of the lower frequency is described.

On the assumption that frequency A is switched to frequency B, frequency B=b/a frequency A (b/a>0; b and a are integers), a line number of one unit in the case of frequency A is n, a line number m of one unit in the case of frequency B is m=n×a/b=na/b (n>m). In this case, a bank number q=(n/c)+1 (q is an integer), where the greatest common divisor c of n and m is a constant.

To be more specific, for example, on the assumption that frequency 45 is switched to frequency 60 (i.e., multiplied by 4/3) and a display line number in the case of frequency 45 is 80, a display line number in the case of frequency 60 is 60 (=80×45/60).

When the display line number 60 and the display line number 80 are processed by a common bank capable of storing a fixed line number, the number of necessary banks can be calculated as follows. First, the fixed line number should preferably be the greatest common divisor of 60 and 80. In this case, greatest common divisor is 20. On the assumption that a bank capable of storing the line number 20 is used, the number of banks necessary for processing the display line number 80 which is relatively large (or larger than the display line number 60) by the bank of the fixed line number 20 is 80/20+1=5. The greatest common divisor 20 is used in this case, but the fixed line number is not limited to the greatest common divisor. Fort example common divisor can be used.

In the above-described embodiments, the touch detection system SE comprises the common electrodes (driving electrodes Tx) and the touch detection electrodes Rx facing the common electrodes. However, the touch detection system is not limited to this type and may be a self-detection touch detection system.

FIG. 16 shows an example of the self-detection touch detection system. In the self-detection touch detection system, touch detection electrodes Sx are two-dimensionally arranged and each equipped with a lead. The touch detection electrodes Sx are, for example, transparent electrodes, and are formed of indium tin oxide (ITO), etc. In the example of FIG. 16, touch detection electrodes Sx of x columns by n rows are provided on a second substrate. The touch detection electrode Sx may be used as common electrodes C during a display period. The touch detection electrodes Sx may be provided inside or outside a display panel PAN. Each touch detection electrode Sx is periodically charged and discharged through the lead. When a discharged is finished, a potential of each of output signals Sxsa1 to Sxsan, Sxsb1 to Sxsbn, Sxsc1 to Sxscn, . . . of the touch detection electrodes Sx is measured. For example, when the user's finger is close to a touch detection electrode Sx at a position enclosed by a dot line, a potential of the corresponding output signal Sxsa1 is detected as a value lower than those of the other electrodes. The touchpanel controller IC2 can thereby determine a touch position. FIG. 17A to FIG. 17D are illustrations of the operating principle of the self-detection touch detection system.

Figure 17A:
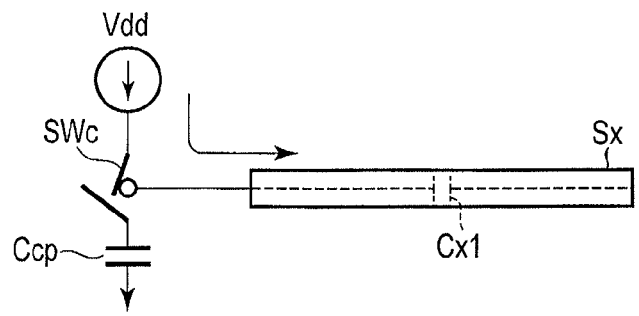
FIG. 17A is an illustration of an operating principle of the self-detection touch detection system showing a situation where an electrode is charged.
Figure 17B:
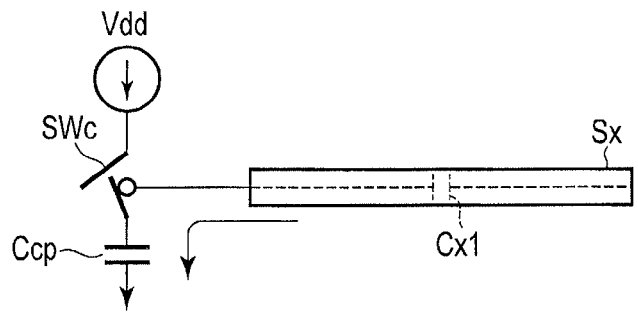
FIG. 17B is an illustration of the operating principle of the self-detection touch detection system showing a situation where the electrode is discharged.

FIG. 17A and FIG. 17B show a state where the user's finger neither touches nor approaches the upper surface of the display panel. Thus, capacitance Cx2 does not occur between the touch detection electrode Sx and the finger. In FIG. 17A, a power source Vdd and the touch detection electrode Sx are connected by a control switch SWc. In FIG. 17B, the power source Vdd and the touch detection electrode Sx are disconnected and the touch detection electrode Sx is connected to the capacitor Ccp by the control switch SWc. Capacitance Cx1 is charged in the state of FIG. 17A and discharged in the state of FIG. 17B. Charging capacitance Cx1 means writing a regular write signal to the touch detection electrode Sx. Discharging capacitance Cx1 means reading a signal indicative of a change in capacitance that occurs in the touch detection electrode Sx.

Figure 17C:
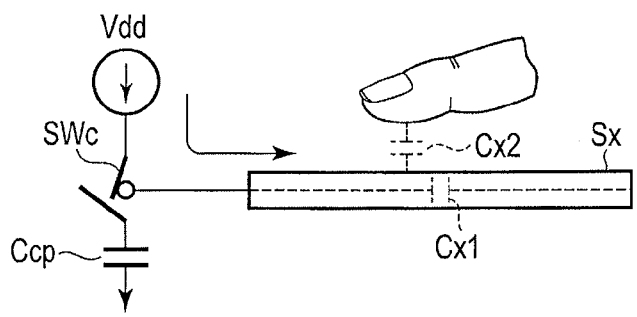
FIG. 17C is an illustration of the operating principle of the self-detection touch detection system showing a situation where the electrode is charged while a finger is close to the touch detection electrode.

FIG. 17C shows a state where the user's finger touches or approaches the touch detection electrode Sx. Thus, capacitance Cx2 occurs between the touch detection electrode Sx and the finger. In FIG. 17C, the power source Vdd and the detection electrode Sx are connected by the control switch SWc. In FIG. 17B, the power source Vdd and the touch detection electrode Sx are disconnected and the touch detection electrode Sx is connected to the capacitor Ccp by the control switch SWc.

Figure 17D:
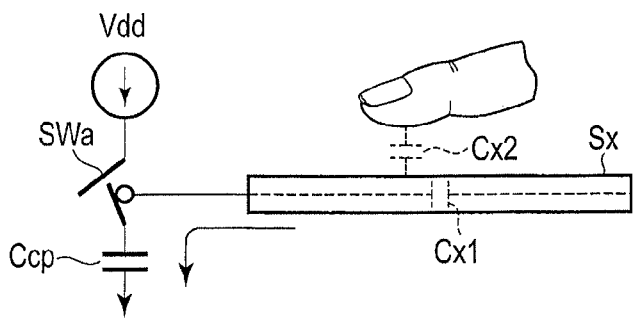
FIG. 17D is an illustration of the operating principle of the self-detection touch detection system showing a situation where the electrode is discharged while the finger is close to the touch detection electrode.

Capacitance Cx1 is charged in the state of FIG. 17C and discharged in the state of FIG. 17D.

Because of the occurrence of capacitance Cx2, the voltage change characteristic of capacitance Ccp at the time of discharge shown in FIG. 17D is obviously different from that of FIG. 17B. Therefore, in the self-detection method, input position information (for example, presence or absence of operation input) can be determined by using the voltage change characteristic of capacitance Ccp which differs according to presence or absence of capacitance Cx2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above-described embodiments, several banks are allocated in a memory, one bank has a capacity of a fixed line number (LN0) of consecutive pixel data, and a group of lines of the pixel data to be consecutively written to the memory is defined as one unit. The controller sets a line number (LN2) of one unit to a line number (LNx2) equal to the fixed line number (LN0) on one condition, and sets a line number (LN1) of one unit to a line number (LNx1) greater than the fixed line number (LN0) on the other condition. The one condition is that noise is detected by a touchpanel controller to which detection signals are input from detection electrodes of the touch detection system. The other condition is that noise is not detected by the touchpanel controller for a certain time.

However, various conditions can be used for switching the line number of one unit. For example, the conditions may be changed according to image content, use environment of the display device or conscious switching by the user.

(i) For example, in game content, the conditions are changed according to image content in the case where a touch operation needs to be frequently performed and touch detection is important and the case where a touch operation is relatively-slowly performed.

(ii) The conditions are changed according to use environment of the display device when a use environment where oscillation is strong and an oscillation frequency is high and a use environment where oscillation is weak and an oscillation frequency is low are frequently switched.

(iii) The user may consciously switch the sensitivity of touch detection when using the display device.

As other conditions, brightness of backlight and aperture positions in a barrier reflecting tracking in a stereo display device may be switched according to a predetermined frequency, and the number of lines to be written in a display period may be changed by changing the frequency of switching the backlight brightness and the aperture positions in the barrier.

Therefore, the controller serving as the timing generator circuit may allocate banks in the memory, each bank having a capacity of a fixed line number (LN0) of consecutive pixel data, define a group of lines of the pixel data to be consecutively written to the memory as one unit, set a line number (LN2) of the one unit to a line number (LNx2) which is equal to the fixed line number (LN0) on one condition and set a line number (LN1) of the one unit to a line number (LNx1) which is greater than the fixed line number (LN0) on the other condition. The controller is configured to switch a frequency of scanning the common electrodes on the one or the other condition.

What is claimed is:

1. A display device comprising:
   scan lines;
   signal lines;
   pixels arranged near intersections of the scan lines and the signal lines, respectively;
   a memory to which pixel data is written and from which the written pixel data is read;
   a pixel signal output circuit configured to output a pixel signal based on the pixel data read from the memory to arbitrary pixels through the signal lines;
   driving electrodes;
   a touch detection circuit configured to detect signals corresponding to capacitance change based on a scanning signal supplied to the driving electrodes; and
   a controller configured to
   selectively switch a scanning frequency of the scanning signal for scanning the driving electrodes between a first frequency and a second frequency which is less than the first frequency,
   allocate banks in the memory, each bank having a capacity of a fixed number of items of the pixel data,
   set a group of items of the pixel data to be consecutively written to the memory as one unit,
   set the one unit to a first number of items of pixel data which is an integral multiple of the fixed number when the scanning frequency is the first frequency, and
   set the one unit to a second number of items of pixel data which is greater than the fixed number when the scanning frequency is the second frequency.

2. The display device of claim 1, wherein
the controller is configured to
set the one unit to the first number which is equal to the fixed number when the scanning frequency is the first frequency.
3. The display device of claim 1, wherein
the controller is configured to set the one unit to the second number which is an integral multiple of the fixed number when the scanning frequency is the second frequency.
4. The display device of claim 1, wherein
the controller is configured to set the first frequency to be n-times greater than the second frequency, where n is a positive integer equal to or greater than two.
5. The display device of claim 4, wherein the controller is configured to set the one unit to the second number which is n-times greater than the fixed number when the scanning frequency is the second frequency.
6. The display device of claim 4, wherein
a number of the banks is equal to or greater than n+1.
7. The display device of claim 1, wherein
a number of the banks is four or three.
8. The display device of claim 1, wherein
the touch detection circuit is configured to receive a detection signal from the driving electrodes and detect noise, and
the controller is configured to switch the frequency of the scanning signal from the first frequency to the second frequency when the touch detection circuit detects noise.
9. A display comprising:
scan lines;
signal lines;
pixels arranged near intersections of the scan lines and the signal lines, respectively;
a memory to which pixel data is written and from which the written pixel data is read;
a pixel signal output circuit configured to output a pixel signal based on the pixel data read from the memory to arbitrary pixels through the signal lines;
driving electrodes;
a touch detection circuit configured to detect signals corresponding to capacitance change based on a scanning signal supplied to the driving electrodes; and
a controller configured to
selectively switch a scanning frequency of the scanning signal for scanning the driving electrodes between a first frequency and a second frequency which is less than the first frequency,
allocate banks in the memory regardless of whether the scanning frequency is the first frequency or the second frequency, each bank having a capacity of a fixed number of items of the pixel data,
wherein the touch detection circuit is configured to receive a detection signal from the driving electrodes and detect noise, and
the controller is configured to switch the scanning frequency of the scanning signal from the second frequency to the first frequency when the touch detection circuit does not detect noise for a certain time.
10. The display device of claim 9,
wherein the driving electrodes are used as the common electrodes which constitute parts of the pixels.
11. The display device of claim 9, further comprising:
a first driving circuit; and
a second driving circuit,
wherein
the first driving circuit is configured to supply a common voltage to the driving electrodes in display periods in one frame period, and
the second driving circuit is configured to supply a touch detection driving signal to the driving electrodes in a touch detection period between the display periods in the one frame period.
12. A method of driving a display device, the display device comprising signal lines; scan lines; pixels arranged near intersections of the scan lines and the signal lines, respectively; a memory to which pixel data is written and from which the written pixel data is read; a pixel signal output circuit configured to output a pixel signal based on the pixel data read from the memory to arbitrary pixels through the signal lines; and a controller, the method comprising:
selectively switching a scanning frequency of a scanning signal for scanning the driving electrodes between a first frequency and a second frequency which is less than the first frequency;
allocating banks in the memory regardless of whether the scanning frequency is the first frequency or the second frequency, each bank having a capacity of a fixed number of items of the pixel data;
setting a group of items of the pixel data to be consecutively written to the memory as one unit;
setting the one unit to a first number of items of pixel data which is an integral multiple of the fixed number when the scanning frequency is the first frequency; and
setting the one unit to a second number of items of pixel data which is greater than the fixed number when the scanning frequency is the second frequency.
13. A display device comprising:
scan lines;
signal lines;
pixels arranged near intersections of the scan lines and the signal lines, respectively;
a memory to which pixel data is written and from which the written pixel data is read;
a pixel signal output circuit configured to output a pixel signal based on the pixel data read from the memory to arbitrary pixels through the signal lines;
driving electrodes;
a touch detection circuit configured to detect signals corresponding to capacitance change based on a scanning signal supplied to the driving electrodes; and
a controller,
wherein the controller is configured to
selectively switch a scanning frequency of the scanning signal for scanning the driving electrodes between a first frequency and a second frequency which is less than the first frequency,
allocate banks in the memory, wherein each bank to which a time required for consecutively writing the pixel data is a fixed time,
set a write period of the pixel data to be consecutively written to the memory as one unit,
set the one unit to a first period which is an integral multiple of the fixed time when the scanning frequency is the first frequency, and
set the one unit to a second period which is longer than the fixed time when the scanning frequency is the second frequency.

14. The display device of claim 13, wherein the controller is configured to
set the one unit to the first period which is equal to the fixed time when the scanning frequency is the first frequency.

15. The display device of claim 13, wherein the controller is configured to
set the one unit to the second number of items of pixel data which is an integral multiple of the fixed number when the scanning frequency is the second frequency.

16. The display device of claim 13,
wherein the driving electrodes are used as common electrodes which constitute parts of the pixels.

17. The display device of claim 13, further comprising:
a first driving circuit; and
a second driving circuit,
wherein
the first driving circuit supplies a common voltage to the driving electrodes in display periods in one frame period, and
the second driving circuit supplies a touch detection driving signal to the driving electrodes in a touch detection period between the display periods in the one frame period.

* * * * *